US012699504B2

(12) United States Patent　　　(10) Patent No.:　US 12,699,504 B2
Nathwani et al.　　　　　　　　　(45) Date of Patent:　　Aug. 4, 2026

(54) APPLICATION COMPATIBILITY ON A COMPUTING DEVICE

(71) Applicant: Google LLC, Mountain View, CA (US)

(72) Inventors: Sanjay Nathwani, Fremont, CA (US); Ben McCanny, Toronto (CA); Kazuki Takise, Tokyo (JP)

(73) Assignee: Google LLC, Mountain View, CA (US)

( * ) Notice: Subject to any disclaimer, the term of this patent is extended or adjusted under 35 U.S.C. 154(b) by 67 days.

(21) Appl. No.: 18/505,795

(22) Filed: Nov. 9, 2023

(65) Prior Publication Data

US 2024/0077998 A1　　Mar. 7, 2024

Related U.S. Application Data

(63) Continuation of application No. 17/443,865, filed on Jul. 28, 2021, now Pat. No. 11,816,318.

(51) Int. Cl.
*G06F 3/048*　　　(2013.01)
*G06F 3/04812*　　(2022.01)
*G06F 3/0482*　　(2013.01)
*G06F 3/04845*　　(2022.01)
*G06F 3/0486*　　(2013.01)
*G06F 8/61*　　　(2018.01)

(52) U.S. Cl.
CPC ...... *G06F 3/04845* (2013.01); *G06F 3/04812* (2013.01); *G06F 3/0482* (2013.01); *G06F 3/0486* (2013.01); *G06F 8/61* (2013.01)

(58) Field of Classification Search
CPC ............. G06F 3/04845; G06F 3/04812; G06F 3/0482; G06F 3/0486; G06F 8/61; G06F 8/38; G06F 9/451
See application file for complete search history.

(56) References Cited

U.S. PATENT DOCUMENTS

| | | | | |
|---|---|---|---|---|
| 5,907,327 A | * | 5/1999 | Ogura | ................... G06F 3/0486 |
| | | | | 715/764 |
| 7,577,923 B2 | | 8/2009 | Beam et al. | |
| 9,098,369 B1 | | 8/2015 | Lewis et al. | |
| 9,535,567 B1 | | 1/2017 | Bagrinovskiy et al. | |
| 9,940,645 B1 | | 4/2018 | Lewis et al. | |
| 9,961,415 B2 | * | 5/2018 | Philpott | ............... H04L 65/612 |

(Continued)

FOREIGN PATENT DOCUMENTS

| | | | | |
|---|---|---|---|---|
| CN | 104199920 B | * 10/2017 | ....... | G06F 17/30899 |
| CN | 108694073 A | * 10/2018 | ......... | G06F 3/04847 |

(Continued)

OTHER PUBLICATIONS

International Search Report and Written Opinion for PCT Application No. PCT/US2022/074192, mailed on Oct. 31, 2022, 12 pages.

*Primary Examiner* — Rashawn N Tillery

(74) *Attorney, Agent, or Firm* — Brake Hughes Bellermann LLP

(57) ABSTRACT

According to an aspect, a method includes installing an application on a computing device, determining whether to activate a compatibility mode for the application, in response to activating the compatibility mode, determining a restriction to a change to an application window size or shape of a user interface of the application, and rendering a user interface object defining a plurality of predefined sizing options for the user interface of the application.

21 Claims, 31 Drawing Sheets

(56) References Cited

U.S. PATENT DOCUMENTS

| | | | | |
|---|---|---|---|---|
| 10,101,891 B1 * | 10/2018 | Kulewski | ............ | G06F 3/04845 |
| 10,353,530 B1 * | 7/2019 | Truong | .............. | G06F 3/04845 |
| 10,554,696 B2 * | 2/2020 | Singh | ........................ | H04N 7/15 |
| 10,805,427 B1 | 10/2020 | Eddings et al. | | |
| 2009/0193358 A1 * | 7/2009 | Mernyk | .................... | G06F 8/65 |
| | | | | 715/804 |
| 2009/0199173 A1 * | 8/2009 | Ramannavar | ............. | G06F 8/70 |
| | | | | 717/168 |
| 2010/0107118 A1 * | 4/2010 | Pearce | .................... | H04N 5/44 |
| | | | | 715/800 |
| 2010/0262598 A1 * | 10/2010 | Koyama | ................. | G06F 9/451 |
| | | | | 707/723 |
| 2010/0277467 A1 | 11/2010 | Kurihara | | |
| 2010/0325167 A1 * | 12/2010 | Landry | .............. | G06F 11/1469 |
| | | | | 709/217 |
| 2011/0090229 A1 * | 4/2011 | Bacus | ................... | G06F 40/109 |
| | | | | 345/467 |
| 2011/0302528 A1 * | 12/2011 | Starr | ........................ | G06F 9/451 |
| | | | | 715/862 |
| 2012/0084726 A1 * | 4/2012 | Sirpal | ................. | G06F 3/04817 |
| | | | | 715/802 |
| 2013/0176212 A1 * | 7/2013 | Nan | ........................ | G06F 3/033 |
| | | | | 345/157 |
| 2013/0179561 A1 | 7/2013 | Tripathi et al. | | |
| 2013/0179781 A1 * | 7/2013 | Nan | ..................... | G06F 3/0484 |
| | | | | 715/711 |
| 2013/0254755 A1 * | 9/2013 | Yousouf | .................... | G06F 8/60 |
| | | | | 717/170 |
| 2013/0298033 A1 * | 11/2013 | Momchilov | ......... | G06F 40/166 |
| | | | | 715/740 |

| | | | | |
|---|---|---|---|---|
| 2014/0059449 A1 * | 2/2014 | Kim | ........................ | G06F 3/048 |
| | | | | 715/752 |
| 2014/0106795 A1 | 4/2014 | Blades | | |
| 2014/0359602 A1 | 12/2014 | Sawaya et al. | | |
| 2015/0195708 A1 | 7/2015 | Terleski et al. | | |
| 2016/0085438 A1 * | 3/2016 | Doan | ................. | G06F 3/04883 |
| | | | | 715/863 |
| 2016/0342406 A1 | 11/2016 | Ahmed et al. | | |
| 2017/0097744 A1 * | 4/2017 | Forstall | .................... | G06F 8/61 |
| 2017/0140504 A1 | 5/2017 | Jeong et al. | | |
| 2018/0101933 A1 * | 4/2018 | Rasmussen | ......... | G06F 16/9537 |
| 2018/0113670 A1 * | 4/2018 | Liu | ........................ | H04W 4/029 |
| 2018/0143699 A1 * | 5/2018 | Chen | ..................... | G06F 3/0238 |
| 2018/0181289 A1 * | 6/2018 | Weksler | ................. | G09G 5/003 |
| 2018/0189929 A1 * | 7/2018 | Bartelma | .................. | G06T 3/40 |
| 2018/0217727 A1 | 8/2018 | Girard et al. | | |
| 2018/0218132 A1 | 8/2018 | Kalyanasamy et al. | | |
| 2018/0349107 A1 | 12/2018 | Lundeen | | |
| 2019/0187885 A1 * | 6/2019 | Wei | ........................ | G06F 9/451 |
| 2020/0320906 A1 | 10/2020 | Knarr et al. | | |
| 2021/0099590 A1 | 4/2021 | Zhang et al. | | |
| 2022/0197675 A1 * | 6/2022 | Adler | .................... | G06F 3/0481 |
| 2023/0305692 A1 * | 9/2023 | Papamarcos | ......... | G06F 3/0488 |
| 2023/0393700 A1 * | 12/2023 | Louch | .................... | G09G 5/026 |

FOREIGN PATENT DOCUMENTS

| | | | | | |
|---|---|---|---|---|---|
| CN | 110244996 A | * | 9/2019 | | |
| CN | 112463273 A | * | 3/2021 | ............. | G06F 3/147 |
| CN | 114840290 B | * | 9/2022 | | |
| CN | 115237518 A | * | 10/2022 | | |
| EP | 3107272 A1 | * | 12/2016 | ......... | H04M 1/6066 |
| KR | 20180099352 A | * | 9/2018 | .......... | G06F 3/0412 |
| WO | WO-2013119813 A1 | * | 8/2013 | .......... | G06F 3/0481 |

* cited by examiner

442

464

451

453

455

457

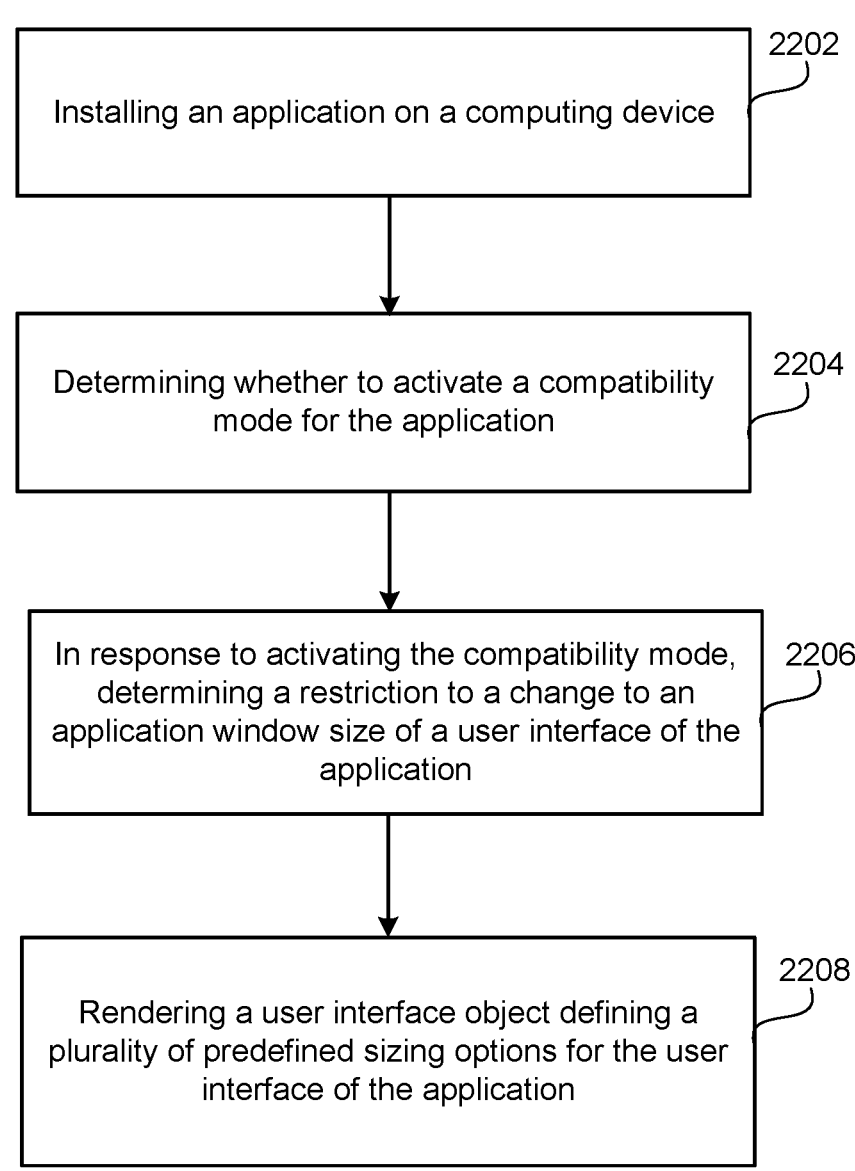

2200

2202

Installing an application on a computing device

2204

Determining whether to activate a compatibility mode for the application

2206

In response to activating the compatibility mode, determining a restriction to a change to an application window size of a user interface of the application

2208

Rendering a user interface object defining a plurality of predefined sizing options for the user interface of the application

FIG. 22

APPLICATION COMPATIBILITY ON A COMPUTING DEVICE

CROSS-REFERENCE TO RELATED APPLICATION

This application is a continuation of, and claims priority to, U.S. patent application Ser. No. 17/443,865, filed on Jul. 28, 2021, entitled "APPLICATION COMPATIBILITY ON A COMPUTING DEVICE", the disclosure of which is incorporated by reference herein in its entirety.

BACKGROUND

Some applications may operate on multiple operating system environments. For example, an application may execute on a first computing device having an operating system of a first type, and the same application may also execute on a second computing device having an operating system of a second type. In some examples, the application may be designed (e.g., optimized) to execute on the operating system of the first type (but not the second type), where execution of the application on the operating system of the second type may cause resizing and/or rendering issues. For example, mobile applications are typically designed (e.g., optimized) to execute on a smaller screen such as a smartphone or a tablet. However, some mobile applications can also be executed on a computing device having a larger screen such as a laptop or desktop computer. For example, a user may download a mobile application on her smartphone. Also, the user may be able to download the same mobile application on her laptop, but, in some examples, the mobile application may not be optimized to operate on the laptop's larger display screen, which may cause rendering issues.

SUMMARY

According to an aspect, a method includes installing an application on a computing device, determining whether to activate a compatibility mode for the application, in response to activating the compatibility mode, determining a restriction to a change to an application window size or shape of a user interface of the application, and rendering a user interface object defining a plurality of predefined sizing options for the user interface of the application. An apparatus may be provided configured to execute the operations of the method. Also, a computer-readable medium may be provided to execute the operations of the method.

According to some aspects, the method, apparatus, or computer-readable medium may include one or more of the following features (or any combination thereof), such as rendering the user interface of the application on a display of the computing device, receiving a resize request to resize or reshape the user interface on the display, and disallowing the resize request. The features may include adjusting a user interface scale of application content to be displayed within the user interface of the application and rendering the application content in the user interface according to the adjusted user interface scale. The features may include adjusting a display size of application content to be displayed in the user interface to be less than or equal to a window size of the user interface. The features may include removing a user interface control element that is configured to be displayed within the user interface of the application. The features may include rendering the user interface of the application on a display of the computing device, wherein the user interface object is rendered in response to the user interface being rendered on the display. The features may include rendering the user interface of the application on a display of the computing device, the user interface including a selectable user interface element, wherein the user interface object is rendered in response to receipt of the selectable user interface element being selected. The features may include changing an area of the user interface to indicate that resizing is restricted and rendering the user interface with the changed portion on a display of the computing device. The features may include enabling a hotkey for a function of the application and displaying information about the hotkey in the user interface of the application. The features may include wherein the application is a mobile application, and the mobile application is a native application configured to execute on a mobile operating system of a mobile computing device. The features may include obtaining at least one compatibility signal, the at least one compatibility signal including at least one of an application list or a resizability value and determining to activate the compatibility mode based on the at least one compatibility signal. The features may include transmitting, over a network, a compatibility request to an application store platform executable by a server computer, receiving, over the network, a compatibility response from the application store platform, and determining to activate the compatibility mode based on the compatibility response. The features may include obtaining metadata associated with the application and determining to activate the compatibility mode based on the metadata. The features may include transmitting, via an inter-process communication link, a compatibility request to a software container or a virtual machine configured to execute the application on the computing device, receiving, via the inter-process communication link, a compatibility response from the software container, and determining to activate the compatibility mode based on the compatibility response.

According to an aspect, an apparatus includes at least one processor and a non-transitory computer-readable medium storing executable instructions that when executed by the at least one processor cause the at least one processor to install an application on a computing device, activate a compatibility mode for the application, wherein activation of the compatibility mode indicates that the application is missing a function or has a function incompatible with an operating system of the computing device, enable, in response to the compatibility mode being activated, a window resize lock to restrict a change to an application window size or shape of a user interface of the application, and render a user interface object defining a plurality of predefined sizing options for the user interface of the application. A method may be provided that includes the operations of the apparatus. Also, a computer-readable medium may be provided to execute the operations of the apparatus.

According to some aspects, the method, apparatus, or computer-readable medium may include one or more of the following features (or any combination thereof), obtaining at least one compatibility signal, the at least one compatibility signal including at least one of an application list or a resizability value and determine to activate the compatibility mode based on the at least one compatibility signal. The features may include transmitting, over a network, a compatibility request to an application store platform executable by a server computer, receiving, over the network, a compatibility response from the application store platform, and determining to activate the compatibility mode based on the compatibility response. The features may include obtaining metadata associated with the application and determining to activate the compatibility mode based on the metadata. The features may include transmitting, via an inter-process communication link, a compatibility request to a software container or a virtual machine configured to execute the application on the computing device, receiving, via the inter-process communication link, a compatibility response from the software container, and determining to activate the compatibility mode based on the compatibility response. The features may include rendering an operating system setting interface, the operating system setting interface including a setting that allows a user to select whether or not to enable the window resize lock. The features may include rendering a user interface object that indicates that the application has a function that is incompatible with the operating system of the computing device.

According to an aspect, a non-transitory computer-readable medium storing executable instructions that when executed by at least one processor cause the at least one processor to install an application on a computing device, activate a compatibility mode for the application, wherein activation of the compatibility mode indicates that the application is missing a function or has a function incompatible with an operating system of the computing device, enable, in response to the compatibility mode being activated, a window resize lock to restrict a change to an application window size of a user interface of the application, adjust a user interface scale of application content to be rendered within the user interface of the application, render the application content in the user interface of the application according to the adjusted user interface scale. An apparatus may be provided that performs the operation of the non-transitory computer-readable medium. Also, a method may be provided that performs the operations of the non-transitory computer-readable medium.

According to some aspects, the method, apparatus, or computer-readable medium may include one or more of the following features (or any combination thereof), rendering a user interface object defining a plurality of predefined sizing options for the user interface of the application. The features may include receiving a resize request to resize or reshape the user interface, rendering, in response to the resize request, a user interface object that includes a selectable control to relaunch the application, and relaunching, in response to receipt of a selection to the selectable control, the application such that the user interface is resized on the display according to the resize request. The features may include detecting a position of a cursor icon on the display and changing the shape of the cursor icon in response to the position of the cursor icon being detected within a threshold distance of an edge of the user interface. The features may include enabling a drag-and-drop feature for a function of the application and rendering a drag-and-drop interface on the user interface of the application, the drag-and-drop interface configured to allow a user to move data into the application.

In addition to the methods described herein, there is disclosed an apparatus comprising at least one processor and a non-transitory computer-readable medium storing executable instructions that when executed by the at least one processor cause the at least one processor to perform any of the methods. There is also disclosed for a non-transitory computer-readable medium storing executable instructions that when executed by at least one processor cause the at least one processor to perform any of the methods disclosed herein. There is also disclosed a computer program product comprising instructions to cause one or more processors to perform any of the methods disclosed herein. Similarly, where disclosure is presented in terms of an apparatus or computer readable medium, a corresponding method is also disclosed. The details of one or more implementations are set forth in the accompanying drawings and the description below. Other features will be apparent from the description and drawings, and from the claims.

BRIEF DESCRIPTION OF THE DRAWINGS

FIG. 22 illustrates a flowchart depicting example operations of a system according to an aspect.

DETAILED DESCRIPTION

Figure 1A:
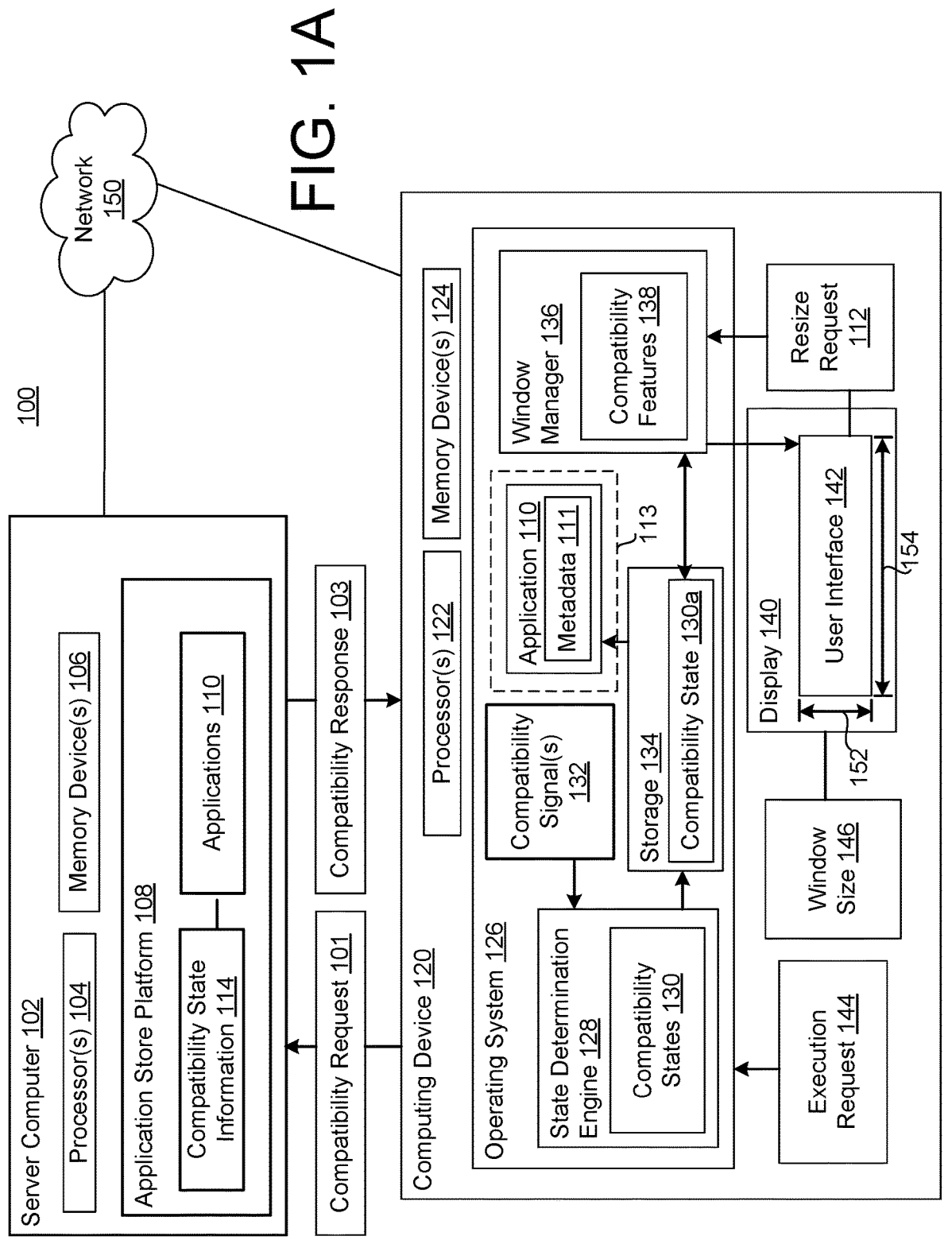
FIG. 1A illustrates a system for enabling one or more compatibility features to improve the compatibility of applications that execute on a computing device according to an aspect.

This disclosure relates to systems and/or methods that can improve the compatibility of non-optimized applications on a computing device, thereby improving the execution and user experience of the application on the computing device. In some examples, the applications include mobile applications designed or optimized to execute in a mobile environment (e.g., smartphone or tablet) but can also be installed and executed on a larger computing device such as a laptop or desktop computer (e.g., a device with a larger display than a typical mobile environment). In some examples, the mobile applications are not optimized to execute on the larger computing device, which can cause technical problems associated with rendering or resizing issues (including the sudden termination of the application). More generally, an application may be designed for a display of a first type (and/or an operating system of a first type) but can also execute using a display of a second type (and/or an operating system of a second type), where the execution of the application using the display of the second type (e.g., different form factor) and/or using the operating system of the second type (e.g., different operating system) can cause technical problems associated with rendering or resizing issues. However, the embodiments discussed herein provide a technical solution in which a window manager is configured to enable one or more compatibility features, thereby providing one or more technical benefits of improving the application's execution and user experience on the computing device.

For example, in response to an application being installed on the computing device, a state determination engine may determine to activate a compatibility mode for the application, which may cause one or more compatibility features to be enabled. In some examples, activation of the compatibility mode may indicate that the application has a function that is incompatible with an operating system of the computing device and/or has a function that is incompatible with a display of the computing device. In some examples, activation of the compatibility mode may indicate that the application is missing one or more functions that may degrade the application's execution and/or user experience on the computing device.

For example, a mobile application executable by a smartphone may be designed to support one or a small number of window layouts (e.g., a small layout size, a large layout size, etc.). The same mobile application may be installed on a larger computing device such as a laptop or desktop computer (also referred to as a desktop environment). In the desktop environment, the application's user interface (or window) may be resizable. However, execution of a mobile application (e.g., a non-optimized application) in a desktop environment may cause one or more technical problems. For example, resizing (e.g., freely resizing) the application in the desktop environment may cause it to suddenly terminate because the application developer may not have accounted for window size changes. Display functions of the application may therefore be incompatible with the operating system.

In some examples, an application may incorrectly assume that the application window size and the display size are the same. In some examples, an application may be designed to save the current window size in order to use it later but the window size may change and the application may attempt an action at the location where the application window does not exist anymore. In addition to (or separate from) the resizing incompatibility, the application may be missing function(s) or have other function(s) that are incompatible with the operating system and/or the display of the computing device. For example, the user interface of the application rendered on the display may have a user interface (UI) scale that is different from other applications. In some examples, the application may have one or more incompatibilities relating to user input support such as keyboard, input device (e.g., computer mouse), trackpad, and/or touch input support. Input functions of the application may therefore be incompatible with the operation system and/or display.

In some examples, the state determination engine determines whether to activate the compatibility mode during or after installation of the application. In some examples, the state determination engine determines whether to activate the compatibility mode in response to a launch request but before the user interface of the application is rendered on the display. In some examples, one or more properties (e.g., dynamic properties) may be available (e.g., only available) after the application is launched. The properties may include resizing and/or orientation properties. For example, resizability and orientation may be different for an application depending on, for example, which functionality of the application is launched. Activation of the compatibility mode may indicate that the application is missing a function or has a function that is incompatible with the operating system of the computing device.

The state determination engine may determine to activate the compatibility mode based on one or more compatibility signals. A compatibility signal may be any type of signal that indicates whether the compatibility mode should be activated (e.g., the application is missing a function or has a function that is incompatible with the operating system). The determination to activate a compatibility mode for the application can be based at least in part on the compatibility signal(s). In some examples, the compatibility signal(s) includes an application list identifying a number of applications. In some examples, the application list is a list of applications that have been identified as optimized for the operating system of the computing device. If the application is not on the application list, the state determination engine may determine to activate the compatibility mode. In some examples, the application list is a list of applications that have not been optimized for the operating system of the computing device. If the application is on the application, the state determination engine may determine to activate the compatibility mode.

The compatibility signal(s) may include a resizability value generated by a resizability determination engine. The resizability value may indicate whether or not the user interface of the application is resizable (or re-shapable) on the display of the computing device. In some examples, the resizability value having a first value may indicate that the application is not resizable. If the resizability value is the first value, the state determination engine may determine to activate the compatibility mode. In some examples, the resizability value having a second value may indicate that the application is resizable. If the resizability value is the second value, the state determination engine may determine to activate the compatibility mode. In some examples, the resizability determination engine may analyze the application and determine the resizability value based on the analysis. In some examples, the analysis includes determining whether or not the application can execute dynamic configuration changes associated with resizing operations and/or whether the application identifies one or more layouts for a computer display (e.g., a larger display). In some examples, the analysis may account for other properties such as whether the application is launched for the first time, whether the application is one of the specific types of sizes or shapes (e.g., maximized/full screen applications may not need to be in a compatibility mode), whether the application is one of a special window mode (e.g., picture-in-picture, split screen, etc.), a source from which an application is installed (e.g., type of application store), whether the application has a popularity metric greater than a threshold level, whether the application is a gaming application, and/or whether the application can play video.

In some examples, the state determination engine may query an application store platform to determine whether or not to place the application in a compatibility mode. The application store platform may enable the installation of applications on the computing device. The state determination engine may query the application store platform in response to the application being installed in the computing device. For example, the application store platform may store compatibility state information that indicates whether or not the application is optimized for the operating system of the computing device. In some examples, the application developer may identify one or more platforms that the application is optimized to execute. For example, an application may indicate "designed for mobile" or "designed for desktop." This information may be stored as the compatibility state information. In some examples, storing this information remotely may allow this information to be periodically updated (and kept up to date). In some examples, different operating systems can access the compatibility state information. In some examples, one or more server computers associated with the application store platform may execute one or more processes to automatically determine (e.g., test) whether or not the application is missing a function and/or has a function that is incompatible with the operating system of the computing device and store this information as the compatibility state information. In some examples, the determining (e.g., testing) is executed manually.

In response to the compatibility mode being activated, a window manager associated with the operating system may enable one or more compatibility features. The compatibility feature(s) may improve the execution and user experience of the application on the computing device. The compatibility features may include providing a capability mode indicator that visually indicates that the compatibility mode is activated, enabling a window resize lock (e.g., restricting window resizing), switching between disabling and enabling the window resize lock, permitting resizing to only a limited number of sizes or shapes (e.g., a predefined set of sizes or shapes), relaunching the application in response to a resize request, adjusting the UI scale of the application content on the user interface, adjusting the display size to correspond to the application window size (e.g., adjusting the display size from the point of view of the application to correspond to the application window size or shape), limiting a number of resize events sent to the application during free resizing, enabling hotkeys for functions associated with the application, enabling a drag-and-drop feature for a function associated with the application, adjusting, adding, or deleting one or more UI control elements (e.g., removing a navigation control, adding an additional UI control, or adjusting an icon of the UI control element), and/or automatically positioning (e.g., snapping) the user interface to an edge of the display while retaining the aspect ratio of the window size, etc.

The enabled compatibility feature(s) may provide technical advantages of reducing rendering or resizing issues associated with applications that are missing one or more functions or have one or more features that are incompatible with the device's operating system. In one example, when a user attempts to resize (or reshape) the window of the application on the laptop, the resizing attempt may cause the application to suddenly terminate. However, when the compatibility mode is activated, one or more compatibility features may be enabled, which may include restricting the sizing of the application's window to one or more predefined sizes (or shapes). Rendering issues may therefore be reduced. Also, in addition to (or separately from) restricting resizing, one or more other compatibility features may be enabled in order to improve the execution and user experience of the application on the computing device.

FIGS. 1A through 1D illustrate a system 100 for enabling one or more compatibility features 138 to improve the compatibility of applications 110 that execute on a computing device 120. If it is determined that an application 110 is missing a function or has a function that is incompatible with an operating system 126 of the computing device 120, the application 110 may be placed into a compatibility mode 113 in which one or more compatibility features 138 are enabled to improve the application's execution, improve the user's experience with the application, and/or reduce resizing or rendering issues. An application 110 may be designed (or optimized) to execute on an operating system that is different from the operating system 126 of the computing device 120, which may be referred to as a non-optimized application. In some examples, an application 110 may be designed (or optimized) to execute using a display that is different from a display 140 of the computing device 120 (e.g., the displays have different form factors), which may be referred to as a non-optimized application. A non-optimized application may have a function that is missing or may have a function that is incompatible with the operating system 126 and/or the display 140. In some examples, a non-optimized application has a compatibility issue, where the compatibility issue may fall into one or more categories such as keyboard user experience (UX), input device (e.g., computer mouse) UX, hover state, cursor, application functionality failure, window management, resizing stability, camera, media playback or audio routing, and/or stability.

In some examples, the application 110 is designed (or optimized) to execute on a mobile environment, where the operating system 126 of the computing device 120 is associated with a laptop or desktop environment. Execution of a non-optimized application may cause rendering issues including the sudden termination of the application 110 when resizing the user interface 142 (also referred to as a window or application window) of the application 110. However, by enabling one or more compatibility features 138, these rendering issues may be reduced and the performance of the application 110 can be improved.

The computing device 120 may be any type of computing device that includes one or more processors 122, one or more memory devices 124, a display 140, and an operating system 126 configured to execute (or assist with executing) one or more applications 110. In some examples, the display 140 is the display of the computing device 120. In some examples, the display 140 may also include one or more external monitors that are connected to the computing device 120. The operating system 126 may include a plurality of modules such as a state determination engine 128 and a window manager 136, which are explained later in the disclosure. The operating system 126 is a system software that manages computer hardware, software resources, and provides common services for computing programs. The application 110 that is downloaded and installed on the computing device 120 may be missing a function or have a function that is not compatible with the operating system 126. For example, the operating system 126 may be an operating system of a first type, but the application 110 that is downloaded and installed on the computing device 120 may be designed or optimized for an operating system of a second type. In some examples, the operating system 126 is associated with an operating environment of a laptop or a desktop computer while the application 110 is associated with an operating environment of a tablet or smartphone. In some examples, the operating systems are the same, but the application 110 was optimized to execute on a display that is different than the display 140 of the computing device 120.

The processor(s) 122 may be formed in a substrate configured to execute one or more machine executable instructions or pieces of software, firmware, or a combination thereof. The processor(s) 122 can be semiconductor-based—that is, the processors can include semiconductor material that can perform digital logic. The memory device(s) 124 may include a main memory that stores information in a format that can be read and/or executed by the processor(s) 122. The memory device(s) 124 may include a storage 134 configured to store a compatibility state 130 associated with the application 110, where the compatibility state 130 may include whether or not the application 110 is placed into a compatibility mode 113. Also, the memory device(s) 124 may store applications (e.g., the operating system 126, applications 110, etc.) and modules (e.g., the state determination engine 128, the window manager 136) that, when executed by the processors 122, perform certain operations.

The computing device 120 may communicate with a server computer 102 over a network 150. The server computer 102 may be computing devices that take the form of a number of different devices, for example a standard server, a group of such servers, or a rack server system. In some examples, the server computer 102 may be a single system sharing components such as processors and memories. The network 150 may include the Internet and/or other types of data networks, such as a local area network (LAN), a wide area network (WAN), a cellular network, satellite network, or other types of data networks. The network 150 may also include any number of computing devices (e.g., computer, servers, routers, network switches, etc.) that are configured to receive and/or transmit data within network 150. Network 150 may further include any number of hardwired and/or wireless connections.

The server computer 102 may include one or more processors 104 formed in a substrate, an operating system (not shown) and one or more memory devices 106. The memory devices 106 may represent any kind of (or multiple kinds of) memory (e.g., RAM, flash, cache, disk, tape, etc.). In some examples (not shown), the memory devices 106 may include external storage, e.g., memory physically remote from but accessible by the server computer 102. The server computer 102 may include one or more modules or engines representing specially programmed software. For example, the server computer 102 may include an application store platform 108. The application store platform 108 is configured to provide a plurality of applications 110 to users for downloading and installation. For example, the computing device 120 may have an application that communicates with the application store platform 108 in order to discover applications 110 to be downloaded and installed on the computing device 120.

The computing device 120 may download, over the network 150, an application 110 from the application store platform 108, where the application 110 is at least partially stored (e.g., stored locally) on the operating system 126 of the computing device 120. The application 110 may be any type of software program that, when launched, renders a user interface 142 on a display 140 of the computing device 120. In some examples, the application 110 may be executable by (or running on top of) the operating system 126. In some examples, the application 110 is a mobile application. A mobile application is a native application configured to execute on a mobile operating system of a mobile computing device such as a smartphone or a tablet. A native application is a software program that is developed for use on a particular platform or device, or for a particular operating system. In some examples, the native application is a software program that is developed for multiple platforms or devices. In some examples, the native application is a software program developed for use on a mobile platform and also configured to execute on a desktop or laptop computer. In some examples, the application 110 is an Android application. In some examples, the application 110 is a mobile iOS application. In some examples, the application 110 is a mobile Windows application. In some examples, the applications 110 include Linux applications (or sometimes referred to as Crostini applications).

The application 110 is missing a function or has a function that is incompatible with the operating system 126 of the computing device 120. In some examples, the application 110 does not support window resizing on a larger display screen. In some examples, the operating system 126 may be associated with a laptop or desktop environment, and the application 110 has not been optimized to execute on the laptop or desktop environment. For example, the application 110 may be an application designed for mobile (but not a laptop or desktop environment).

An application 110 (e.g., a mobile application) executable by a smartphone may be designed to support one or a small number of window layouts (e.g., portrait window size, landscape window size, etc.). The same application 110 may be installed on a larger computing device such as a laptop or desktop computer (also referred to as a desktop environment). In the desktop environment, the application's user interface 142 (or window) may be resizable. However, since the application 110 supports one or a small number of window size layouts, resizing (e.g., freely resizing) the application 110 may cause the application 110 to suddenly terminate. In addition to (or separate from) the resizing incompatibility, the application 110 may have other function(s) that are incompatible with the operating system 126 of the computing device 120. For example, the user interface 142 of the application 110 rendered on the display 140 may have a user interface (UI) scale that is different from other applications.

In some examples, the application 110 has one or more incompatibilities relating to user input support (e.g., keyboard, computer mouse, trackpad, touch input support). For example, the application 110 may rely upon touch gestures (whereas, in some examples, the computing device 120 does not support touch gestures or only partially supports touch gestures). Also, the application 110 may have a UI control (e.g., button) that does not indicate click-ability with a hover state. Further, text selection may be inoperable (or the application 110 does not support copy/paste right click options), the trackpad or mouse wheel scrolling may be inoperable in some instances, pressing enter to confirm an edit or send a message may be inoperable, and/or pressing a spacebar to pause video may be inoperable. In some examples, the application 110 may not support selecting multiple items (e.g., with CTRL and shift). In some examples, the application 110 may not support changing a visual aspect of a cursor when hovering over clickable UI elements.

After the application 110 has been installed on the operating system 126 of the computing device 120, the state determination engine 128 may determine whether or not the application 110 has a function that is incompatible with the operating system 126 of the computing device 120. If the application 110 is designed for only a mobile platform, the state determination engine 128 determines that the application 110 is missing a function or has a function that is incompatible with the operating system 126 of the computing device 120, and the state determination engine 128 places the application 110 in a compatibility mode 113 in which one or more compatibility features 138 are enabled. The placing of the device in a compatibility mode, in which one or more compatibility features can be implemented or enabled, can reduce rendering issues and/or reduce instability of the application during execution. Therefore, execution of the application on the operating system may therefore be improved. If the application 110 is designed for mobile and the laptop/desktop environment, the state determination engine 128 determines that the application 110 is compatible with the operating system 126 of the computing device 120, and the state determination engine 128 does not place the application 110 in a compatibility mode 113.

The state determination engine 128 may determine a compatibility state 130 among a plurality of compatibility states 130 and may store the determined compatibility state 130 in the storage 134. The storage 134 may be a persistent memory that stores settings for the operating system 126. In some examples, the state determination engine 128 determines the compatibility state 130 in response to the application 110 being installed on the operating system 126. In some examples, the state determination engine 128 determines the compatibility state 130 during at least a portion of the installation of the application 110. In some examples, the state determination engine 128 determines the compatibility state 130 after the application 110 is installed on the operating system 126. In some examples, the state determination engine 128 determines the compatibility state 130 in response to an execution request 144, where the execution request 144 is a request received by the operating system 126 to launch the application 110. In some examples, the state determination engine 128 determines the compatibility state 130 each time the application 110 is launched. In some examples, the state determination engine 128 determines the compatibility state 130 before the user interface 142 is rendered on the display 140.

The stored compatibility state 130 may indicate whether or not the application 110 is placed in the compatibility mode 113. The plurality of compatibility states 130 may include two or more compatibility states 130. As shown in FIG. 1C, the compatibility states 130 may include a com-patibility state 130a and a compatibility state 130b. The compatibility state 130a may be a value that indicates that the compatibility mode 113 is activated. For example, if the state determination engine 128 determines that the application 110 is missing a function and/or has a function that is incompatible with the operating system 126 of the computing device 120, the state determination engine 128 identifies the compatibility state 130a and stores the compatibility state 130a in the storage 134.

The compatibility state 130b may be a value that indicates that the compatibility mode 113 is deactivated. For example, if the state determination engine 128 determines that the application 110 is compatible with the operating system 126 of the computing device 120, the state determination engine 128 identifies the compatibility state 130b and stores the compatibility state 130b in the storage 134.

In some examples, the plurality of compatibility states 130 may include more than two compatibility states 130 such as compatibility state 130c and compatibility state 130d. The compatibility state 130c may be a value that indicates that the compatibility mode 113 is not-eligible (or undefined). The compatibility state 130d may be a value that indicates that the application 110 is eligible (e.g., ready) to be placed in the compatibility mode 113. In some examples, the state determination engine 128 identifies the compatibility state 130d after the application 110 is installed (but before the application 110 is launched).

In some examples, the compatibility states 130 are configured as a state machine. For example, before the application 110 is installed, the compatibility state 130 is the compatibility state 130c (e.g., not-eligible). In some examples, in the compatibility state 130c, a setting to enable or disable the compatibility mode 113 may be hidden from the user. In response to the application 110 being installed, the compatibility state 130 may transition to the compatibility state 130d (e.g., eligible). In some examples, in the compatibility state 130d, the compatibility mode 113 is ready to be activated, and the setting to enable or disable the compatibility mode 113 is hidden from the user. In response to the application 110 being launched, the state determination engine 128 may determine whether or not to activate the compatibility mode 113. If the state determination engine 128 determines to activate the compatibility mode 113, the compatibility state 130 transitions to the compatibility state 130a (e.g., activated), where one or more compatibility features 138 may be enabled. In some examples, in the compatibility state 130a, the setting to enable or disable the compatibility mode 113 can be presented to the user. In some examples, in response to receipt of a selection to deactivate the compatibility mode 113 (e.g., from the user), the compatibility state 130 transitions to the compatibility state 130b (e.g., deactivated). In the compatibility state 130b, the setting to enable or disable the compatibility mode 113 can be presented to the user. Also, in the compatibility state 130b, one or more compatibility features 138 may be disabled. In some examples, in response to the application 110 being uninstalled, the compatibility state 130 transitions back to the compatibility state 130c (e.g., not-eligible or undefined).

The state determination engine 128 may determine whether to activate the compatibility mode 113 based on one or more compatibility signals 132. In some examples, the compatibility signal(s) 132 are obtained (or generated) locally on the computing device 120. In some examples, compatibility signal(s) 132 are obtained (over the network 150) from one or more server computers (including server computer 102). In some examples, the compatibility signal (s) 132 are obtained (or generated) from multiple sources such as the computing device 120 and one or more server computers. As shown in FIG. 1D, the compatibility signal(s) 132 may include the compatibility state 130 that is stored in the storage 134, an application list 105 and/or a resizability value 107 determined by a resizability determination module 109.

The application list 105 may identify a number of applications that are predetermined to be compatible with the operating system 126. In some examples, the state determination engine 128 receives the application list 105 and determines whether the application 110 is on the application list 105. If the application 110 is not on the application list 105, the state determination engine 128 may identify the compatibility state 130a and store the compatibility state 130a in the storage 134. In some examples, the state determination engine 128 may change the value associated with the application 110 in the storage 134 from the compatibility state 130d to the compatibility state 130a. If the application 110 is on the application list 105, the state determination engine 128 may identify the compatibility state 130b and store the compatibility state 130b in the storage 134. In some examples, the state determination engine 128 may change the value associated with the application 110 in the storage 134 from the compatibility state 130d to the compatibility state 130b.

The resizability determination module 109 is configured to analyze the application 110 and determine a resizability value 107 based on the analysis of the application 110. In some examples, the resizability determination module 109 may determine whether the application 110 can execute dynamic configuration changes associated with resizing operations and/or whether the application 110 provides one or more UI layouts for the display 140. The resizability value 107 may indicate whether or not the application 110 is resizable on the display 140. The state determination engine 128 may receive the resizability value 107, and if the resizability value 107 indicates that the application 110 does not support resizing (e.g., dynamic resizing), the state determination engine 128 may identify the compatibility state 130a and store the compatibility state 130 in the storage 134. If the resizability value 107 indicates that the application 110 does support resizing, the state determination engine 128 may identify the compatibility state 130b and store the compatibility state 130 in the storage 134.

The compatibility signal(s) 132 may include other signals such as whether the application 110 is launched for the first time, whether the application 110 is one of the specific types of sizes or shapes (e.g., maximized/full screen applications may not need to be in a compatibility mode), whether the application 110 is one of a special window mode (e.g., picture-in-picture, split screen, etc.), a source from which an application 110 is installed (e.g., type of application store), whether the application 110 has a popularity metric greater than a threshold level, whether the application 110 is a gaming application, and/or whether the application 110 can play video, etc.

The state determination engine 128 may receive the compatibility state 130 that is stored in the storage 134. For example, if the compatibility state 130 is the compatibility state 130d (e.g., ready), the state determination engine 128 may determine whether or not the compatibility mode 113 should be activated using the application list 105 and/or the resizability value 107. Also, in some examples, the user is able to deactivate the compatibility mode 113 (and then later activate the compatibility mode 113). For example, a user interface (e.g., a setting interface) may be displayed to the user that allows the user to activate or deactivate the compatibility mode 113 with respect to a particular application 110. If the compatibility mode 113 is deactivated by the user, the storage 134 may be updated to indicate the compatibility state 130b. In some examples, in response to receipt of the execution request 144, the state determination engine 128 may obtain the value from the storage 134. If the value indicates the compatibility state 130b, in some examples, the state determination engine 128 may continue to identify the compatibility state 130b (since it would indicate that the user has deactivated the compatibility mode 113). In some examples, after the application 110 is closed (e.g., terminated), the value in the storage 134 automatically reverts back to the compatibility state 130c (e.g., ready).

In some examples, the state determination engine 128 may query the application store platform 108 to determine whether or not the application 110 is missing a function or has a function incompatible with an operating system 126 of the computing device 120. For example, the applications 110 may be tagged as either "Optimized for Desktop" or "Designed for Mobile." For example, the application store platform 108 may include compatibility state information 114 that indicates whether or not the application 110 is optimized to execute on the operating system 126. For example, an application developer may provide information on whether their application 110 is designed for mobile and/or designed for mobile and laptop/desktop environments. If the application 110 is only designed for a mobile platform, the compatibility state information 114 may include information that the application 110 is only designed for a mobile platform. If the application 110 is designed for a mobile platform and a laptop/desktop platform, the compatibility state information 114 may include information that the application 110 is designed for both platforms. In some examples, the server computer 102 associated with the application store platform 108 may execute one or more processes (e.g., automated testing process) to automatically determine whether or not the application 110 is missing a function or has a function that is incompatible with the operating system 126 of the computing device 120 and store this information as the compatibility state information 114. In some examples, a manual testing process is performed, and the compatibility state 130 may be updated with the results of the manual testing process.

The state determination engine 128 may transmit, over the network 150, a compatibility request 101 to the application store platform 108, where the compatibility request 101 is a request to obtain the compatibility state information 114 associated with the application 110. In some examples, the compatibility request 101 is transmitted in response to the application 110 being installed. In some examples, the compatibility request 101 is transmitted in response to the application 110 being launched. The state determination engine 128 may receive, over the network 150, a compatibility response 103 from the application store platform 108. The compatibility response 103 may indicate whether or not the application 110 is missing a function or has a function incompatible with the operating system 126 of the computing device 120. In some examples, the compatibility response 103 may indicate that the computing device 120 is designed for a mobile environment. In some examples, the compatibility response 103 may indicate that the computing device 120 is designed for a laptop desktop environment. In some examples, the compatibility response 103 may identify the compatibility state 130. In some examples, the compatibility response 103 may indicate which of the compatibility features 138 to enable. The determination to activate a compatibility mode 113 for the application 110 can be based at least in part on the compatibility response 103. Transmitting the compatibility request 101 when the application 110 is launched may provide a dynamic approach, where changes in the functionality of the application 110 over time can be taken into account as the application is updated by a developer (for example). For example, the compatibility response may change as compared to a previous launch of the application if the application is updated and/or functionalities are added/removed.

In some examples, the state determination engine 128 may obtain metadata 111 about the application 110 during an installation of the application 110 on the operating system 126 of the computing device 120. In some examples, the application store platform 108 is configured to inject metadata 111 into the application 110, where the metadata 111 may identify whether or not the application 110 has a function incompatible with the operating system 126 of the computing device 120. For example, the metadata 111 may indicate whether the application 110 is designed for only a mobile platform or for a mobile platform and a desktop/laptop platform. Based on the metadata 111, the state determination engine 128 may determine the compatibility state 130 for the application 110. The metadata 111 may be updated if and when the application 110 is updated. A dynamic approach to determining whether to enter or enable a compatibility mode 113 may therefore be provided.

The window manager 136 may obtain the compatibility state 130*a* from the storage, and, if the compatibility state 130 is the compatibility state 130*a*, the application 110 is configured to execute in the compatibility mode 113 in which one or more compatibility features 138 are enabled.

Figure 1B:
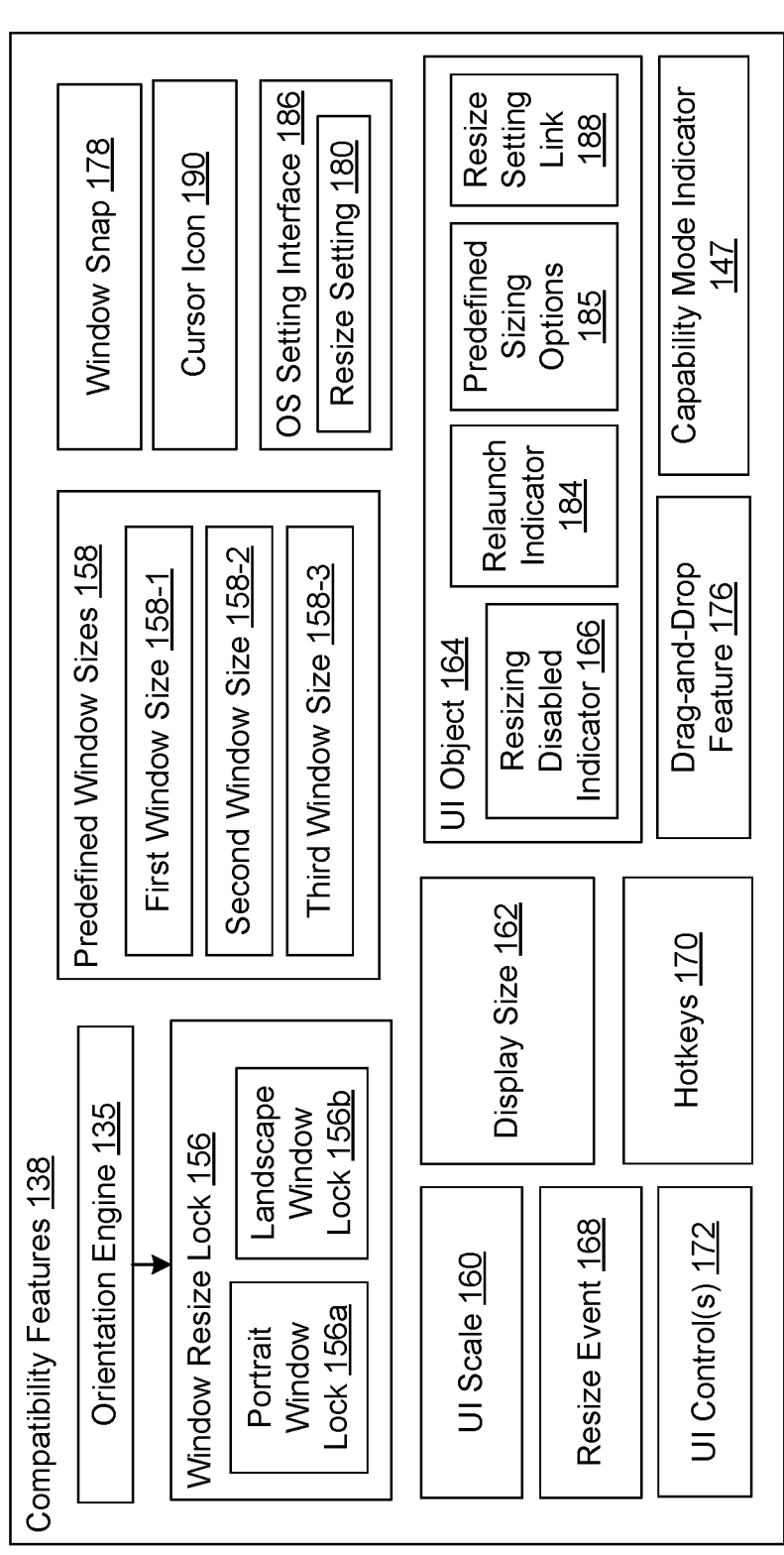
FIG. 1B illustrates non-limiting examples of compatibility features according to an aspect.
Figure 1D:
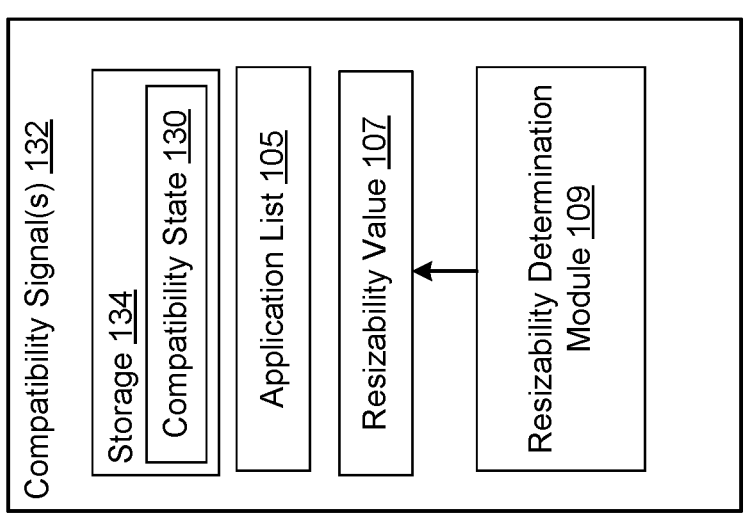
FIG. 1D illustrates compatibility signals used to determine whether to activate a compatibility mode for an application according to an aspect.
Figure 1C:
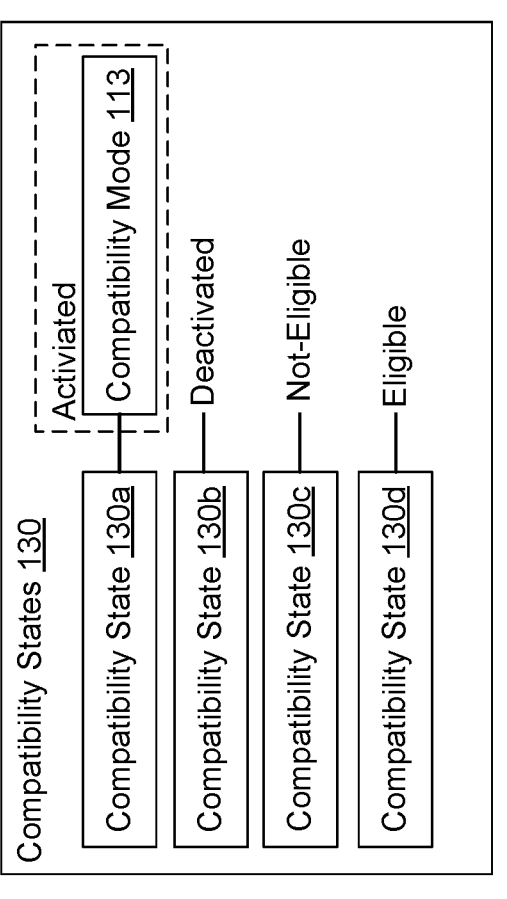
FIG. 1C illustrates compatibility states for an application according to an aspect.

FIG. 1B illustrates a plurality of compatibility features 138. When the compatibility mode 113 is activated, the window manager 136 may enable one or more of the compatibility features 138 in order to improve the performance of the application 110 and/or reduce rendering issues that sometimes occurs when executing an application 110 that is not optimized to execute on the operating system 126. In some examples, when the compatibility mode 113 is activated, the window manager 136 determines to restrict a change to an application window size (e.g., a height 152, a width 154) of the user interface 142 of the application 110. In other words, changes to the application window size may be restricted. In some examples, a user may not be able to resize or shape the user interface 142 at all. In some examples, the user may be able to switch to one of a plurality of predefined sizing options 185, but freely resizing the user interface 142 is still restricted by the determination to restrict a change to the application window size. Restriction a change to the application window size may be provided by enabling a window resize lock 156.

In response to the execution request 144 (e.g., a request to launch the application 110), the application 110 is launched in the compatibility mode 113, where a user interface 142 of the application 110 is rendered on the display 140 of the computing device 120. In some examples, in order for the user to identify that the application 110 is executing in the compatibility mode 113 (where one or more features may be restricted, changed, deleted, and/or added), the user interface 142 of the application 110 includes a capability mode indicator 147. The capability mode indicator 147 may visually indicate that the application 110 is executing in the compatibility mode 113. The capability mode indicator 147 may be a portion of the user interface 142 that is changed. For example, the window manager 136 may change a portion of the user interface 142 to indicate that the application 110 is executing in the compatibility mode 113. In some examples, a border area of the user interface 142 is transparent or semi-transparent, which may indicate that the application 110 is not resizable (e.g., freely resizable). In some examples, an icon (e.g., an application icon on the app launcher, a cursor icon, etc.) is rendered on a portion of the user interface 142 that indicates that the application 110 is executing in the compatibility mode 113. In some examples, the capability mode indicator 147 may be identified by a changed background. In some examples, the window manager 136 may center the user interface 142 on a blurred wallpaper background, which may indicate that the application 110 is executing in the compatibility mode 113. For example, the operation system 126 may enter an immersive mode, and the front application typically spans the whole display 140. However, when an application 110 is placed into the compatibility mode 113, in some examples, the application 110 cannot be resized to the full display 140, so, instead the window manager 136 may make the background blurred to give an immersive experience. In other words, a portion (e.g., an area) of the user interface 142 may be changed or altered to indicate that resizing is restricted, and the user interface 142 with the changed portion rendered on a display 140 of the computing device 120. The changing or altering of the portion of the user interface 142 may be based on (or responsive to) determining a restriction to a change to the application window size or shape.

In some examples, the application 110 is resizable by default (unless the application 110 specifically identifies itself as being non-resizable). In some examples, the application 110 is an application that has not been identified as being non-resizable. In examples, resizing may also include re-shaping the user interface 142. When the application 110 is resizable, users can drag-resize (e.g., free resizing or reshaping), maximize/restore, and position the application 110 into a multi-view mode. A multi-view mode may be a display technique in computer graphics that includes dividing graphics and/or text into two or more adjacent (non-overlapping or partially overlapping) sections of the display 140. In some examples, a multi-view mode is a split-screen view. In some examples, the application 110 is an application that does not execute dynamic configuration changes associated with resizing operations. In some examples, the application 110 is not configured with a UI layout designed for the display 140. For example, if the display 140 is a larger screen (e.g., laptop screen), the application 110 may not define a UI layout for the larger screen.

When the compatibility mode 113 is activated for the application, the window manager 136 may enable a window resize lock 156 in which resizing the user interface 142 of the application 110 is restricted. When the window resize lock 156 is enabled, the window manager 136 may prevent the application 110 from being placed into a multi-view mode. When the window resize lock 156 is enabled, any drag-resize requests may be disregarded. To resize a user interface 142 by dragging, an edge area (e.g., top edge, bottom edge, right edge, or left edge) of the user interface 142 is selected and moved to a desired position. The window manager 136 may disregard resize requests 112 that are generated based on user-provided actions. For example, the window manager 136 may receive a resize request 112 when the user attempts to drag-resize the user interface 142. When the application 110 is placed in the compatibility mode 113 and the window resize lock 156 is enabled, the window manager 136 may prevent the resizing of the user interface 142 by disallowing the resize request 112. For example, the user may attempt to drag-resize the user interface 142 but may disallow the resize request 112 when the window resize lock 156 is enabled. In some examples, disallowing the resize request 112 may include disallowing the resize request 112 based on the determined restriction to change the application window size.

The window resize lock 156 may include a portrait window lock 156a. For example, the window manager 136 may enable the portrait window lock 156a in which the window size 146 is rendered in a portrait orientation (when initially launched on the display 140), and the window size 146 is prevented from being resized to a different size. The portrait orientation is when the height 152 is greater than the width 154. In some examples, the portrait window size corresponds to a phone size. In some examples, the window resize lock 156 includes a landscape window lock 156b. For example, the window manager 136 may enable the landscape window lock 156b in which the window size 146 is rendered in a landscape orientation (when initially launched on the display 140), and the window size 146 is prevented from being resized to a different size. The landscape orientation is when the width 154 is greater than the height 152. In some examples, the landscape window size corresponds to a table size, and may be larger than the portrait window size. In some examples, when the window resize lock 156 is enabled, the user interface 142 of the application 110 is rendered in a maximized size (e.g., full-screen size) and the user interface 142 is restricted from being resized. A maximized size is a size in which the window size 146 is the same or substantially the same (e.g., difference being less than 5 mm, 2 mm, or 1 mm) as the size of the display 140.

In some examples, if the compatibility mode 113 is activated, the portrait window lock 156a is triggered. In some examples, if the compatibility mode 113 is activated, the landscape window lock 156b is triggered. As applications 110 may be only optimized for a small number of layouts, the applications 110 may be locked to the optimized orientation. In some examples, the portrait orientation corresponds to a phone size, and the landscape orientation corresponds to a tablet size. In some examples, applications 110 (e.g., mobile applications) are most likely to be optimized for one of them. Applications 110 are most likely to support at least portrait layout unless they declare themselves as landscape-only, which, in some examples, a portrait window lock 156a is enabled by default. Also, usually, applications 110 that execute on a laptop/desktop, should be launched in a large window (e.g., largest as possible) to make the most of the display 140. However, for applications 110 that are likely to support only phone and/or tablet sizes, the portrait window lock 156a or the landscape window lock 156b is enabled.

In some examples, an orientation engine 135 may determine an orientation in which the window resize lock 156 is enabled, where the orientation may be the portrait window size, the landscape window size, a maximized size, or other type of orientation. In some examples, the orientation engine 135 is included within the window manager 136. In some examples, the orientation engine 135 is logic on the operating system 126 that is separate from the window manager 136. In some examples, the orientation engine 135 may determine the orientation to apply the window resize lock 156 based on an orientation value provided by the application 110 (e.g., portrait-only, landscape-only, unspecified, etc.) and a resizability flag (e.g., resizability value 107). In some examples, if the orientation value and the resizability flag is insufficient to determine the orientation, the orientation engine 135 may trigger an automated evaluation (or manual evaluation) to identify the best orientation for the application 110. In some examples, the orientation engine 135 may obtain user-provided orientation data about an optimal orientation for an application 110 (e.g., obtained from a number of different users), and then determine the orientation for the application 110 based on the user-provided orientation data.

In some examples, the window manager 136 is configured to render a UI object 164 on the user interface 142, where the UI object 164 indicates a resizing disabled indicator 166. In some examples, the resizing disabled indicator 166 is a UI splash screen that is rendered on the user interface 142 when the application 110 is initially launched. The resizing disabled indicator 166 may indicate that the application 110 is missing a function or has a function that is incompatible with the operating system 126 of the computing device 120 and/or that resizing is disabled. The resizing disabled indicator 166 may indicate that the application 110 is not optimized for the computing device 120 and that enabling free resizing may lead to application crashes or rendering issues. The rendering of the resizing disabled indicator 166 may reduce stability and rendering issues. In some examples, the resizing disabled indicator 166 may provide a selectable option to enable resizing, e.g., to disable the window resize lock 156. If the user selects to enable resizing, in some examples, the window manager 136 is configured to disable the window resize lock 156. In some examples, the window manager 136 is configured to update the storage 134 to deactivate the compatibility mode 113 by storing the compatibility state 130b.

In some examples, the window manager 136 may render an operating system setting interface 186, where the operating system setting interface 186 includes a resize setting 180 that allows a user to select whether or not window resize is allowed for the application 110. The operating system setting interface 186 may be an interface that provides settings associated with the operating system 126. For example, the operating system setting interface 186 may provide settings for the network, Bluetooth connection, connected devices, and the applications installed on the computing device. In the per-app settings, the operating system setting interface 186 may provide a resize setting 180 (e.g., a toggle switch) that allows the user to select whether window resize is allowed or not. The window manager 136 may disable the window resize lock 156 in response to the user selecting the option that resizing is allowed. The window manager 136 may update the storage 134 based on the user selection. For example, if the user selects that resizing is allowed, the window manager 136 may update the storage 134 with the compatibility state 130b, which indicates that the compatibility mode 113 is deactivated.

The window manager 136 may render a UI object 164 on the user interface 142, wherein the UI object 164 includes a resize setting link 188. If the user selects the resize setting link 188, the window manager 136 renders the operating system setting interface 186 with the resize setting 180.

The window manager 136 may receive a resize request 112 to resize the user interface 142. In response to the resize request 112, the window manager 136 may render a UI object 164 that includes a relaunch indicator 184 to relaunch the application 110. Then, in response to receipt of a selection to the selectable control, the window manager 136 may relaunch the application 110 such that the user interface 142 is resized on the display according to the resize request 112. For example, when resized, the application 110 may not be rendered in the new size but relaunching the application 110 ensures that the application is rendered in the new size.

Relaunching the application 110 in this way may reduce instability of the application 110 and/or reduce rendering issues during resizing.

The window manager 136 is configured to detect a position of a cursor icon 190 on the display 140. In response to the position of the cursor icon 190 being detected within a threshold distance of an edge of the user interface 142, the window manager 136 may change the cursor icon 190 in order to indicate that resizing is not allowed. For example, the user may position the cursor icon 190 at (or near) the edge of the user interface 142 in order to "grab" the edge and resize the user interface 142 to the desired width 154 or height 152, but the window manager 136 may change the cursor icon 190 when the cursor icon 190 is detected within a threshold distance of an edge of the user interface 142. The cursor icon 190 may be changed to a different shape or entirely different icon in order to indicate that drag-resizing is not allowed. In some examples, the window manager 136 is configured to change an aspect (e.g., size, shape, color, and/or graphic, etc.) of the cursor icon 190 in response to the cursor icon 190 being positioned within a threshold distance of a selectable UI element. For example, if the application 110 displays a selectable UI element, the window manager 136 detects that the cursor icon 190 is positioned over or within a threshold distance of the selectable UI element, the window manager 136 may change the cursor icon 190 to indicate that the UI element is selectable.

The window manager 136 may enable resizing to different predefined window sizes 158. For example, the user may be able to switch to two, three, or more predefined window sizes 158, but freely resizing the user interface 142 is still restricted. For example, the user still would not be able to drag-resize the user interface 142. In some examples, the window manager 136 is configured to render a UI object 164 on the user interface 142, where the UI object 164 provides a plurality of predefined sizing options 185 that corresponds to the predefined window sizes 158. In some examples, the UI object 164 is rendered on the user interface 142 when the application 110 is launched. In some examples, the window manager 136 receives a resize request 112, and, instead of resizing the window size 146 of the user interface 142 according to the resize request 112, the window manager 136 renders the UI object 164 with the predefined sizing options 185. For example, a user may attempt to drag the user interface 142 to resize, and, in response to the drag-resize attempt, the window manager 136 may render the UI object 164 with the predefined window sizes 158. Rendering the UI object 164 with a predefined or predetermined sizing option (e.g., a window size) can reduce application instability and/or reduce rendering issues on the computing device 120 during the resize operation and/or during subsequent execution of the application 110 at the computing device 120. Application performance may therefore be improved.

The predefined window sizes 158 may include a first window size 158-1 and a second window size 158-2, where the second window size 158-2 is different from the first window size 158-1 (e.g., at least one of the height 152 or width 154 is different). In some examples, the second window size 158-2 is larger than the first window size 158-1. In some examples, the first window size 158-1 relates to a mobile size, and the second window size 158-2 relates to a tablet size. In some examples, the window manager 136 initially renders the user interface 142 according to the first window size 158-1. The user is provided with the option to switch to the second window size 158-2. In some examples, the predefined window sizes 158 include a third window size 158-3 that is different from the first window size 158-1 or the second window size 158-2. In some examples, the third window size 158-3 is larger than the first window size 158-1 and the second window size 158-2. In some examples, the third window size 158-3 is a maximized size in which the user interface 142 substantially corresponds to a size of the display 140.

When the compatibility mode 113 is activated, the window manager 136 may adjust a UI scale 160 of the user interface 142 of the application 110. In other words, responsive to determining that a compatibility mode 113 be activated for the application 110, the UI scale 160 of application content to be displayed within the user interface 142 may be adjusted. In some examples, the window manager 136 may increase the UI scale 160 to enlarge aspects of the user interface 142 such as the text and graphics in order to correspond to the UI scale associated with applications that are optimized to execute on the operating system 126. For example, the user interface 142 of the application 110 is initially configured to be rendered on the display 140 according to a first UI scale. However, before the user interface 142 is launched, the window manager 136 may adjust the first UI scale to a second UI scale such that the user interface 142 is rendered on the display 140 according to the second UI scale.

When the compatibility mode 113 is activated, the window manager 136 may adjust a display size 162 of the application 110 to correspond to the window size 146. The display size 162 may be the display size from the point of view of the application 110 via an application programming interface (API) that queries the display size 162. The display size 162 may be the width and/or the height of the text and graphics of the application 110 that are displayed on the display 140. The window manager 136 may decrease the display size 162 to correspond to the window size 146 of the user interface 142. As applications for mobile generally execute in full-screen mode on a phone or tablet, application developers usually do not distinguish the window size 146 and display size 162 (e.g., if an application runs in full-screen mode, they return the same value). However, for mobile applications that operate on larger devices such as a laptop, the mobile applications can execute in freeform environments, so differences between the display size 162 and the window size 146 can lead to rendering issues. In some examples, adjusting a display size 162 of the application 110 includes adjusting a display size 162 as seen (or from the point of view of the application 110) includes adjusting a display size 162 of application content to be displayed in the user interface 142 to be less than or equal to a window size 146 of the user interface 142.

The window manager 136 may increase the UI scale 160 to enlarge aspects of the user interface 142 such as the text and graphics in order to correspond to the UI scale associated with applications that are optimized to execute on the operating system 126. For example, the user interface 142 of the application 110 is initially configured to be rendered on the display 140 according to a first UI scale. However, before the user interface 142 is launched, the window manager 136 may adjust the first UI scale to a second UI scale such that the user interface 142 is rendered on the display 140 according to the second UI scale.

When the application 110 is in the compatibility mode 113, the window manager 136 may adjust, add, or delete one or more UI controls 172 associated with the user interface 142 of the application 110. For example, when the application 110 executes on an operating system 126 for which it is not optimized to execute, the user interface 142 may provide one or more UI controls 172 that are either redundant, not applicable, and/or insufficient to properly navigate the application 110. In some examples, the window manager 136 may remove the maximize and/or restore controls when resizing restriction is enabled. In some examples, the window manager 136 may remove a back navigation button that may cause confusion to the user when rendered in the user interface 142. For example, responsive to determination to activate the compatibility mode 113, a user interface control element that is configured (e.g., originally configured) to be displayed within the user interface 142 may be removed (or altered).

When the application 110 is in the compatibility mode 113, the window manager 136 may enable one or more hotkeys 170 to execute one or more functions that are usually touch commands on a mobile platform and render information about the hotkeys 170 on the user interface 142. For example, responsive to determining that the compatibility mode 113 is activated, a hotkey 170 for a function of the application 110 may be enabled and information about the hotkey 170 is displayed in the user interface 142 of the application 110. A hotkey 170 is a key or a combination of keys on a computer keyboard that provide access to a particular function associated with the execution of the application 110. In some examples, hotkeys 170 may be referred to as shortcut keys. The window manager 136 may detect that the application 110 includes a chat section that allows the user to type text. On the mobile platform, to send the message, a user would typically have to provide a touch command on the send key. However, when the application 110 executes on the laptop/desktop platform, the window manager 136 may implement a hotkey 170 (e.g., hit enter to send) so that the user can use the keyboard to send the message. In some examples, the window manager 136 may enable a hotkey 170 (e.g., press enter) to pause and start video or audio. In some examples, the window manager 136 may enable a hotkey 170 to exit a UI object (e.g., a UI dialog).

When the application 110 is in the compatibility mode 113, the window manager 136 may enable a drag-and-drop feature 176. The drag-and-drop feature 176 may be a UI feature that allows the user to select a file or image and drag it into a drop area using a mouse so that the file or image can be received by the application 110.

When the application 110 is in the compatibility mode 113, the window manager 136 may delay a resize event 168 or at key thresholds. In some examples, the window resize lock 156 is not enabled (or disabled by the user) (thereby permitting free resizing), but the window manager 136 is configured to adjust the transmission of resize events 168 sent to the application 110 in order to avoid issues that are caused when free resizing is permitted. For example, free resizing non-optimized applications can lead to stability and rendering issues, as well as lower-quality UI layouts. For example, non-optimized applications may not leverage API (s) that allow them to resize relatively smoothly. However, the window manager 136 may implement a restricted version of free resizing (also referred to as smart resizing) by delaying resize events 168 or transmitting the resize events 168 to the application 110 at key thresholds. When smart resizing is enabled by the window manager 136, the number of resize events 168 sent to an application 110 are less than the number of resize events 168 sent to the application 110 during normal free resizing. While an application 110 is being free resized, a plurality of resize events 168 (e.g., resize/move/rerender/relaunch requests) are sent to the application 110, but, in some examples, the application 110 may not be able to correctly process all the resize events 168. When smart resizing is enabled by the window manager 136, the window manager 136 may reduce the number of resize events 168, delay the transmission of the resize events 168, or send the resize events 168 at certain key thresholds (e.g., when a cursor is released and the final size is determined).

In some examples, when the application 110 is in the compatibility mode 113, the window manager 136 may enable window snap 178 while retaining the aspect ratio of the window size. In contrast, according to some conventional window snap techniques, the user interface is repositioned and automatically resized (e.g., resized to half of the display 140). When the window snap 178 is enabled, the user interface 142 can be moved (e.g., repositioned) to an edge portion (e.g., sides or corners) of the display 140 in response to a user-provided command (e.g., using mouse, keyboard, and/or touch) while retaining the same window size 146 such that the user interface 142 is automatically positioned without the need to position the user interface 142 manually. If the window resize lock 156 is the portrait window lock 156a, the user interface 142 has a window size 146 corresponding to a portrait layout, and the user may be prevented from freely resizing the user interface 142. However, based on a user command, the user interface 142 can be automatically repositioned on the display 140 at a location in which the user interface 142 is within a threshold distance (or contacts) an edge of the display 140, where the window size 146 remains the same size (e.g., the portrait layout size).

The compatibility features 138 may include other features to improve the execution of the application 110 on the operating system 126. In some examples, the window manager 136 may detect a UI element that is controllable using a touch command, and the window manager 136 may enable a hotkey 170 to control the UI element or enable a trackpad or computer mouse action to control the UI element. In some examples, the window manager 136 may enable text selection (e.g., highlight text, copy/paste text within the application or to another application, etc.). For example, the application 110 may not support text selection when the application 110 is executing on the operating system 126, but the window manager 136 may detect that text is rendered in the user interface 142, and the window manager 136 may permit the user to select the text rendered in the user interface 142 and/or institute an action with the text such as copying and/or pasting the text. In some examples, the application 110 may not support trackpad scrolling or mouse wheel scrolling. However, when the compatibility mode 113 is enabled, the window manager 136 may detect a function of the application 110 and enable trackpad scrolling or mouse wheel scrolling to execute the function. For example, the application 110 may have a menu with a number of menu items. The window manager 136 may detect the menu and enable trackpad scrolling or mouse wheel scrolling to browse through the menu items.

Figure 2A:
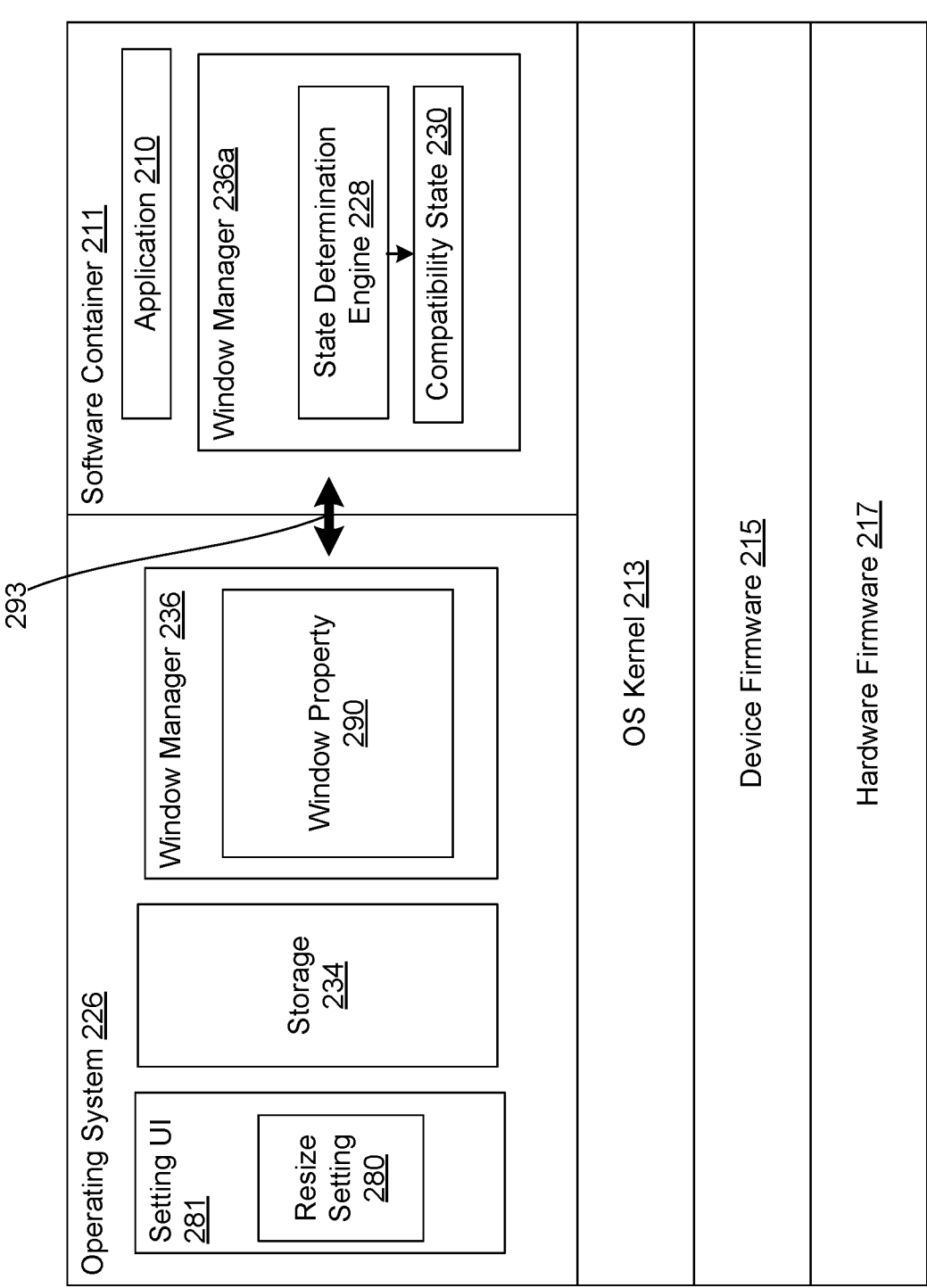
FIG. 2A illustrates an example of an operating system according to an aspect.

FIG. 2A illustrates an operating system 226 according to another aspect. The operating system 226 may be an example of the operating system 126 of FIGS. 1A through 1D and may include any of the features discussed with respect to those figures. The operating system 226 may include setting user interface (UI) 281, storage 234, and a window manager 236. The setting UI 281 includes a plurality of settings including a resize setting 280. The resize setting 280 is a setting that indicates whether or not the window resizing lock is enabled (or more generally whether a compatibility mode should be activated). In some examples, the resize setting 280 is more generally referred to as a compatibility mode setting. The resize setting 280 may be provided to the user via the setting UI 281 that permits the user to select and configure various settings. The storage 234 may store the compatibility state 230 associated with an application 210. If the compatibility state 230 indicates that the compatibility mode is activated, the resize setting 280 is visible to the user. If the compatibility state 230 indicates that the compatibility mode is deactivated, the resize setting 280 is also visible to the user. However, if the compatibility state 230 indicates that the compatibility state 230 is ready to be determined or undefined, the resize setting 280 may be hidden from the user. For example, the resize setting 280 may not be rendered or displayed via the setting UI 281.

The operating system 226 may also define a software container 211 that is configured to launch and execute the application 210. In some examples, instead of using a software container 211, the operating system 226 defines a virtual machine that is configured to launch and execute the application 210. The operating system 226 may receive or obtain an indication that the compatibility mode should be activated from the software container 211 (or the virtual machine). The software container 211 may be an instance of another operating system. In some examples, the software container 211 (or virtual machine) shares an OS kernel 213 with the operating system 226. In some examples, the software container 211 (or the virtual machine) does not share an OS kernel 213 with the operating system 226. The OS kernel 213 is the primary interface between the hardware and the processes of a computing device. The OS kernel 213 is an initial program that is loaded into memory before the boot loader. The OS kernel 213 may operate on device firmware 215, which operates on hardware firmware 217. The software container 211 (or virtual machine) may be a runtime platform that includes software dependencies required by the application 210, such as specific versions of programming language runtimes and other software libraries that assist with executing the application 210. The software container 211 may include a window manager 236a. The window manager 236 and the storage 234 may communicate with one or more components (e.g., the window manager 236a) of the software container 211 (or virtual container) via an inter-process communication (IPC) link 293. In some examples, the window manager 236a includes a state determination engine 228 configured to determine whether to activate a compatibility mode. The window manager 236 is configured to adjust the user interface and apply window manager policies based on the determined state.

Figure 2B:
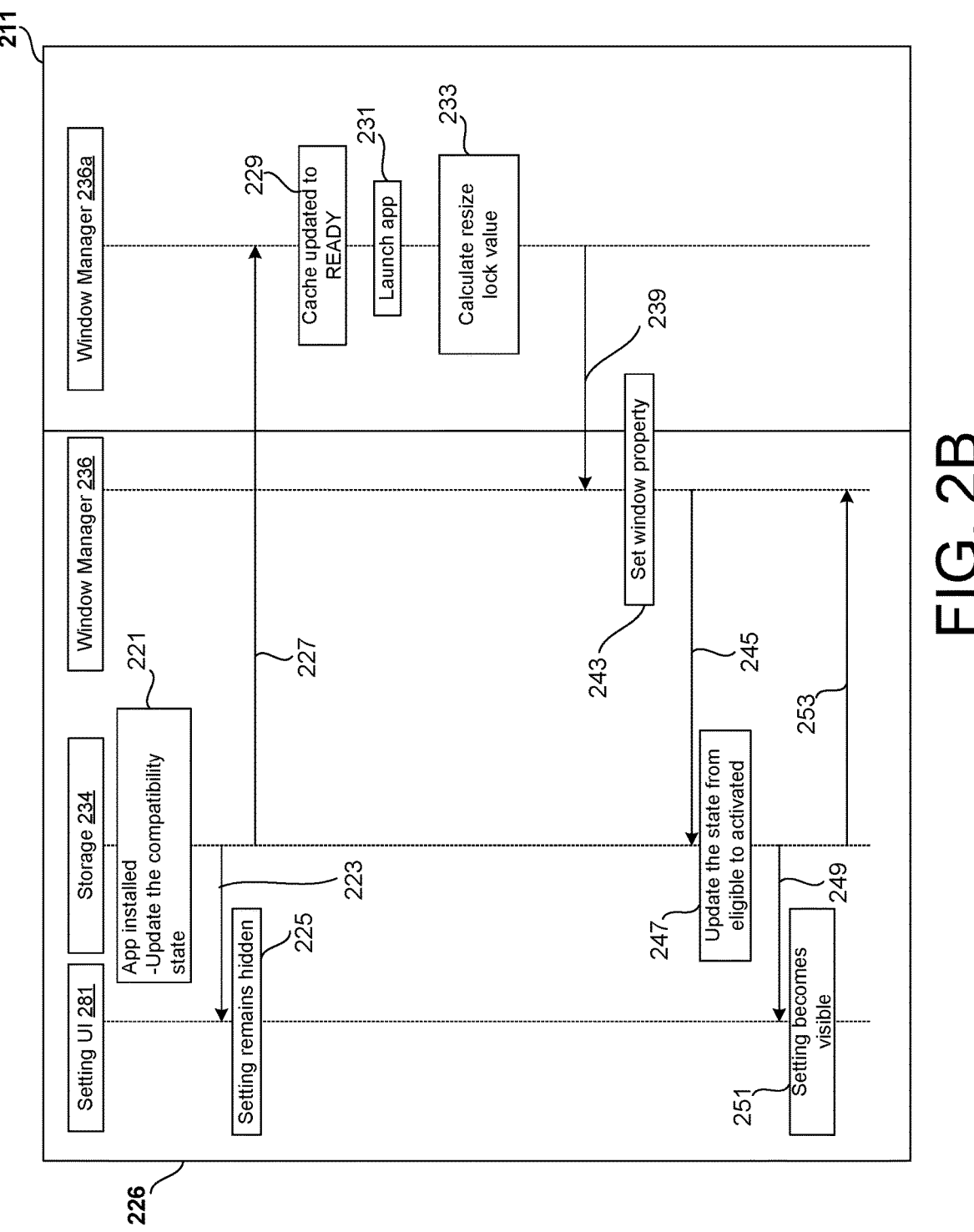
FIG. 2B illustrates a flowchart for determining a compatibility state of the application using the operating system of FIG. 2A according to an aspect.

FIG. 2B illustrates a flowchart for determining whether to activate the compatibility mode for the application 210. In operation 221, the application 210 is installed. The operating system 226 may update the configuration state in the storage 234. Although the flowchart relates to a newly installed application, the techniques can be applied to already-installed applications. The operating system 226 may update the compatibility state 230 in the storage 234 from the compatibility state 130c (e.g., undefined) of FIG. 1C to the compatibility state 130d (e.g., eligible or ready) of FIG. 1C. In operation 223, the storage 234 transmits a request to the setting UI 281 (associated with the operating system 226) to not display the resize setting 280. In operation 225, the resize setting 280 remains hidden from the user. In operation 227, the storage 234 transmits a request to the window manager 236a via the IPC link 293 to determine whether or not the application 210 should be placed in a compatibility mode. In operation 229, the window manager 236a updates a compatibility state in the cache (e.g., storage) within the container 211 (or virtual machine) to eligible or ready. In operation 231, the window manager 236a launches the application 210.

In operation 233, the window manager 236a determines a resize lock value or a compatibility state. In some examples, the window manager 236a includes a state determination engine 228. The state determination engine 228 may be an example of the state determination engine 128 of FIGS. 1A through 1D and may include any of the details discussed with reference to those figures. In some examples, the state determination engine 228 may obtain an application list (e.g., application list 105 of FIG. 1D), and determine whether the application 210 is included on the application list. If the application 210 is not on the application list, the state determination engine 228 may identify a resize lock value that indicates that the window resize lock is enabled or may identify a compatibility state (e.g., compatibility state 130a of FIG. 1C) that indicates that the compatibility mode is activated. Also, the state determination engine 228 may use any of the signals (or parameters) previously discussed to determine the compatibility state. In operation 239, the window manager 236a communicates with the window manager 236 via the IPC link 293 to provide the resize lock value and/or the compatibility state to the window manager 236. In operation 243, after the resize lock value and/or the compatibility state is received at the window manager 236, the window manager 236 sets a window property 290 of the user interface of the application 210 as unresizable (if the compatibility mode is activated). In operation 245, the window manager 236 transmits a request to the storage 234 to update the compatibility state. In operation 247, the compatibility state 230 is updated to indicate that the compatibility mode is enabled. For example, the compatibility state 230 is updated from the compatibility state 130d (e.g., eligible) to the compatibility state 130a (e.g., activated). In operation 249, the storage 234 transmits a request to the setting UI 281 to update the resize setting 280. In operation 251, the resize setting 280 becomes visible on the setting UI 281. In operation 253, the storage 234 notifies the window manager 236 that the resize setting 280 is now available.

Figure 3A:
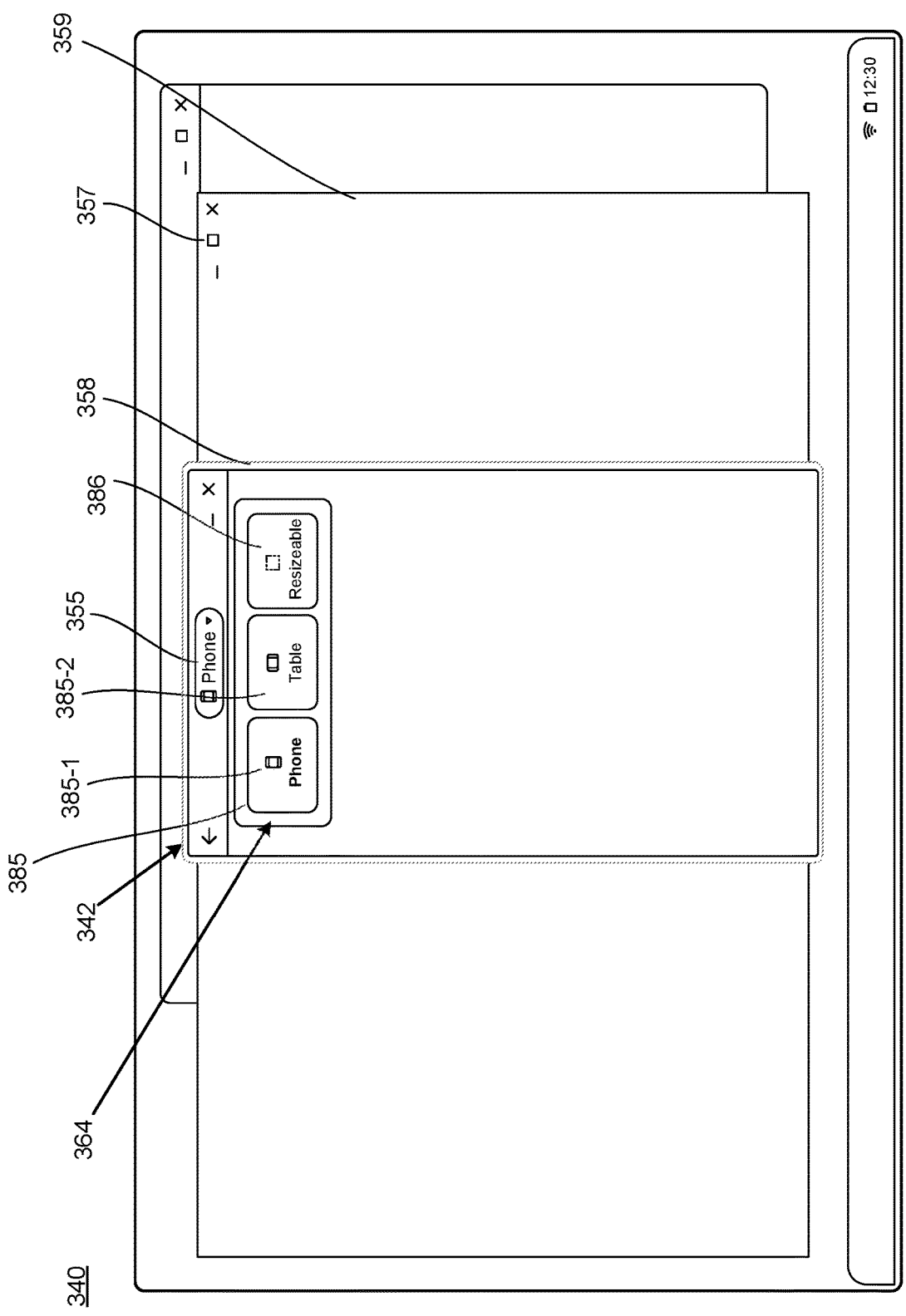
FIGS. 3A through 3E illustrate user interfaces for an application within a compatibility mode according to various aspects.
Figure 3B:
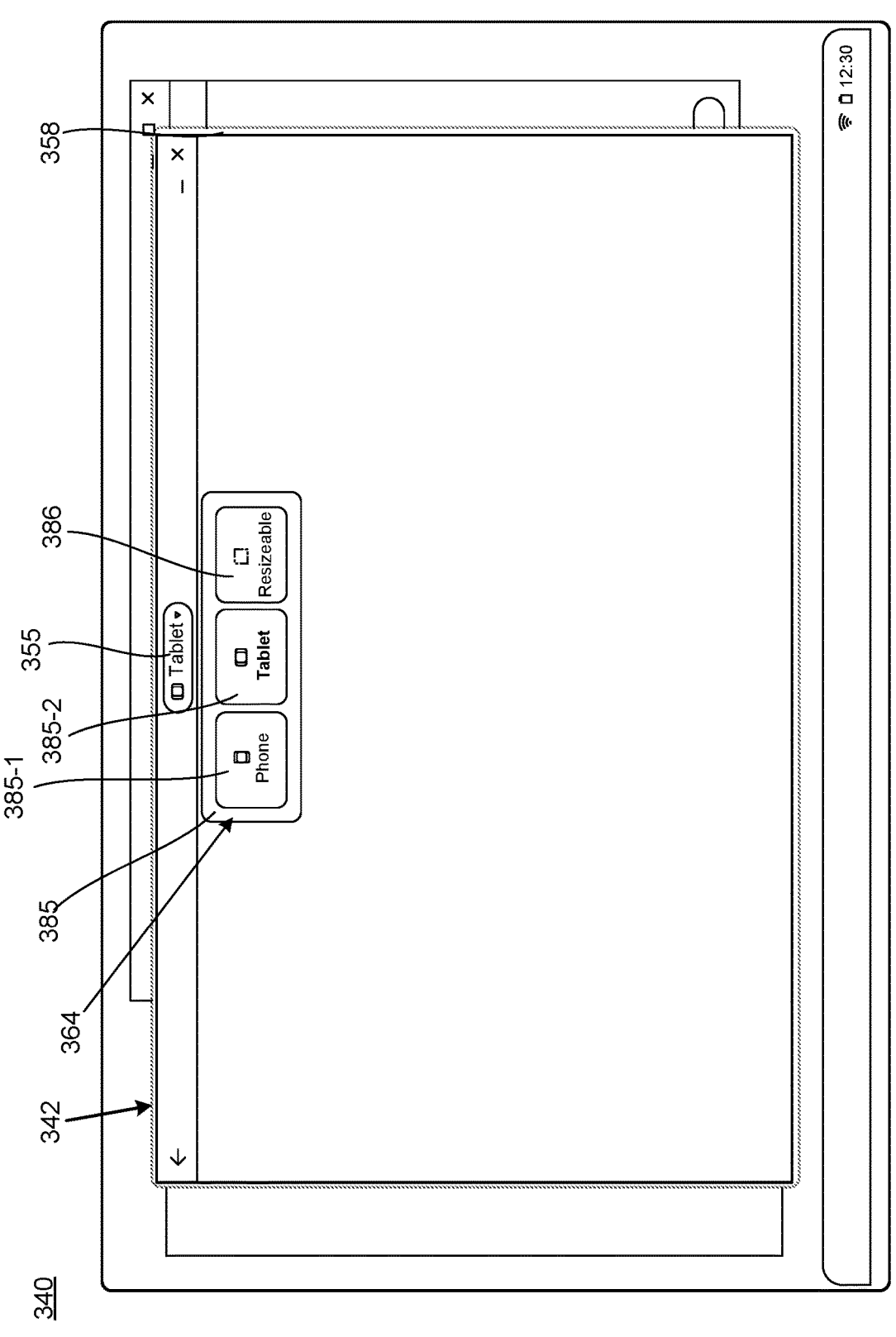
Figure 3C:
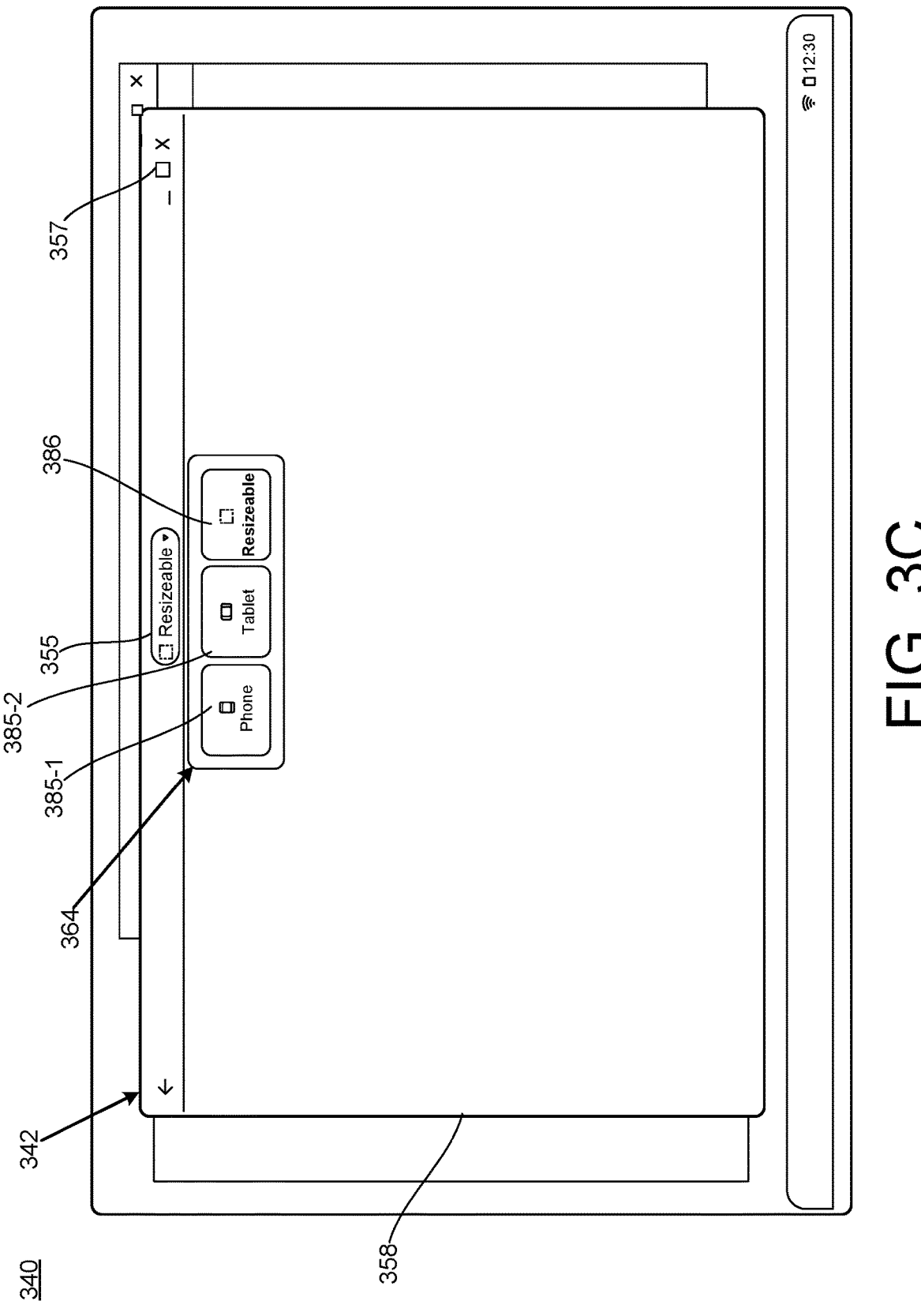
Figure 3D:
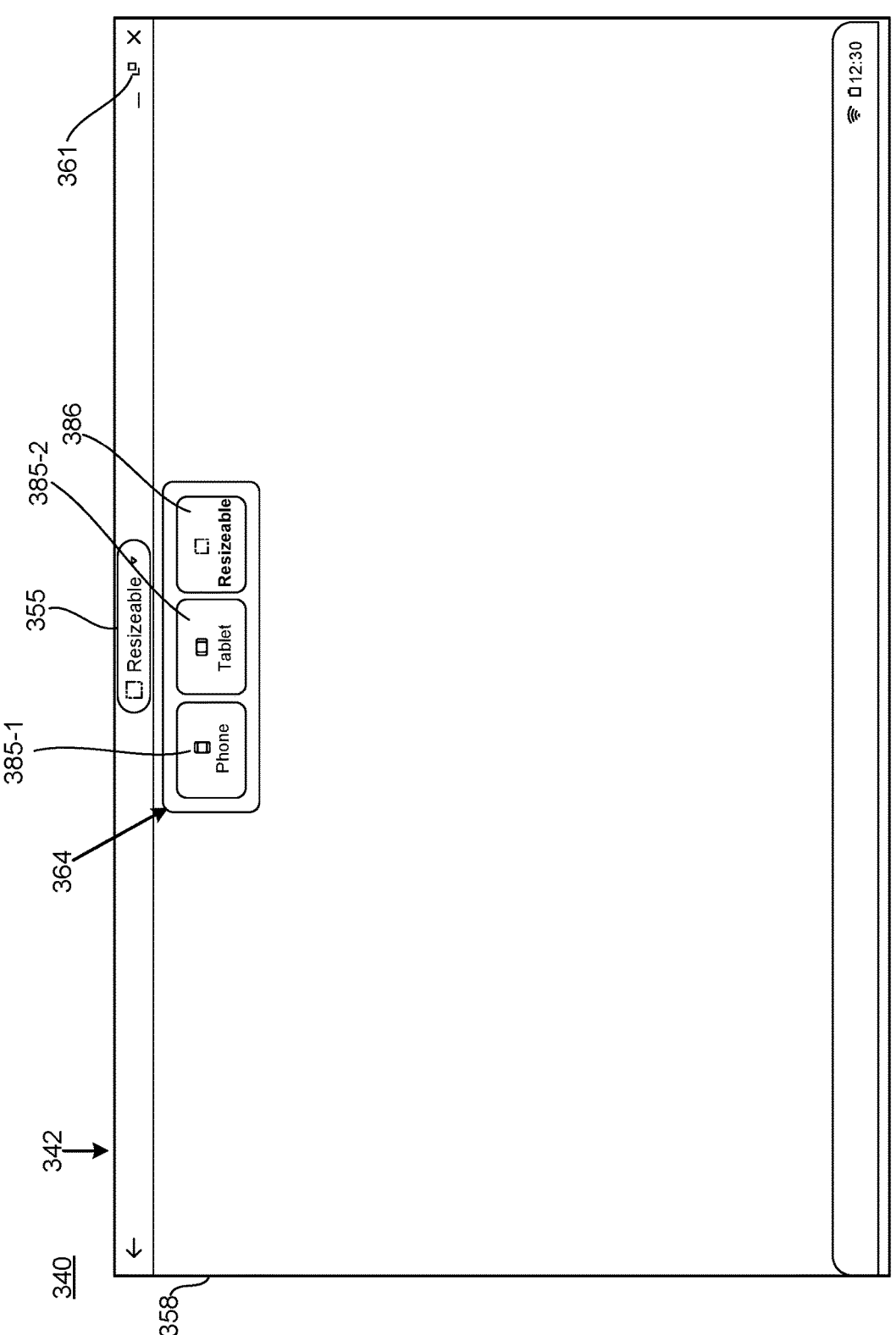

FIGS. 3A through 3E illustrate user interfaces 342 of an application that is rendered on a display 340 when the application is executing in a compatibility mode according to various aspects. FIGS. 3A and 3B illustrate a user interface 342 in which the window resize lock is enabled. FIG. 3A illustrates the user interface 342 according to one of the predefined window sizes, and FIG. 3B illustrates the user interface 342 according to another one of the predefined window sizes. FIG. 3C illustrates a user interface 342 in response to the window resize lock being disabled. FIG. 3D illustrates a user interface 342 in which the user interface 342 is maximized on the display 340.

A user interface 342 of an application (e.g., a mobile application) is rendered on a display 340 of a computing device. The application is executing in a compatibility mode in which a window resize lock is enabled (at least with respect to FIGS. 3A and 3B). In some examples, a border area 358 is changed to be translucent, which indicates that drag-resizing is disabled. Also, a UI object 364 is rendered on the user interface 342, where the UI object 364 identifies a plurality of predefined sizing options 385 that are selectable by the user.

The predefined sizing options 385 include a first window size option 385-1 and a second window size option 385-2. Also, the UI object 364 includes a resizable option 386, which, when selected, causes the window lock to be disabled (and free resizing enabled). The first window size option

385-1 corresponds to a first window size (e.g., the first window size 158-1 of FIG. 1B), and the second window size option 385-2 corresponds to a second window size (e.g., the second window size 158-2 of FIG. 1B). For example, the window size options 385 may identify two or more predefined window sizes. In some examples, the first window size option 385-1 may correspond to a predefined size relating to a phone size (as shown in FIG. 3A), and the second window size option 385-2 may correspond to a predefined size relating to a tablet size (as shown in FIG. 3B). If the user selects the second window size option 385-2 on FIG. 3A, the user interface 342 is resized according to the second window size (e.g., the tablet size) as shown in FIG. 3B. In some examples, the resizable option 386 relates to an option to permit resizing. If the user selects the resizable option 386 on either FIG. 3A or 3B, the window resize lock is disabled, and the user can drag-resize the user interface 342, as shown in FIG. 3C. In FIG. 3C, the translucent of the border area 358 is removed, which would indicate to the user that the user interface 142 can be drag-resized.

Also, as shown in FIGS. 3A and 3B, the display 340 also includes a user interface 359 of another application in the background of the user interface 342. The user interface 359 includes a maximized UI icon 357, which, when selected, causes the user interface 359 to be resized to cover the full display 340. However, the user interface 342 does not include a maximized UI icon 357. For example, when the application is placed in the compatibility mode and either the first window size option 385-1 or the second window size option 385-2 is selected, the maximized UI icon 357 is removed from the user interface 342. However, if the user selects the resizable option 386, the maximized UI icon 357 reappears to provide the option of maximizing the user interface 342. If the user selects the maximized UI icon 357 on FIG. 3C, the user interface 342 is resized to cover the display 340 as shown in FIG. 3D. Then, the maximized UI icon 357 changes to a restore UI icon 361, which, when selected, causes the user interface 342 to be resized according to the window size that existed before the maximized UI icon 357 was selected.

In some examples, when the application is launched (and/or when the compat-mode button is selected), the user interface 342 is displayed with a window size that corresponds to the first window size option 385-1, as shown in FIG. 3A. Also, the first window size option 385-1 may include a visual indicator that indicates that the application is displayed according to the first window size option 385-1. Also, the user interface 342 may include a selectable UI element 355, which, when selected, causes the UI object 364 to appear. The UI element 355 may be a menu item, which, when selected, presents the UI object 364 in the form of a menu with items that permits to select one of a number of predefined resize options. In other words, the user interface 342 of the application may be rendered on a display of the computing device, where the user interface includes a selectable user interface element (e.g., UI element 355). Rendering a user interface object (e.g., UI object 364) defining a plurality of predefined sizing options for the application may be responsive to receipt of the selectable user interface element being selected (e.g., by a user). In some examples, the UI element 355 also identifies which option is currently selected. For example, the UI element 355 indicates "phone" in FIG. 3A, and the UI element 355 indicates "tablet" in FIG. 3B. Also, the UI element indicates "resizable" in FIG. 3C. In some examples, the UI object 364 is rendered on the user interface 342 when the user interface 342 is initially displayed, and then disappears after a threshold period of time has elapsed. Then, the user would select the UI element 355 to have the UI object 364 to reappear.

Figure 3E:
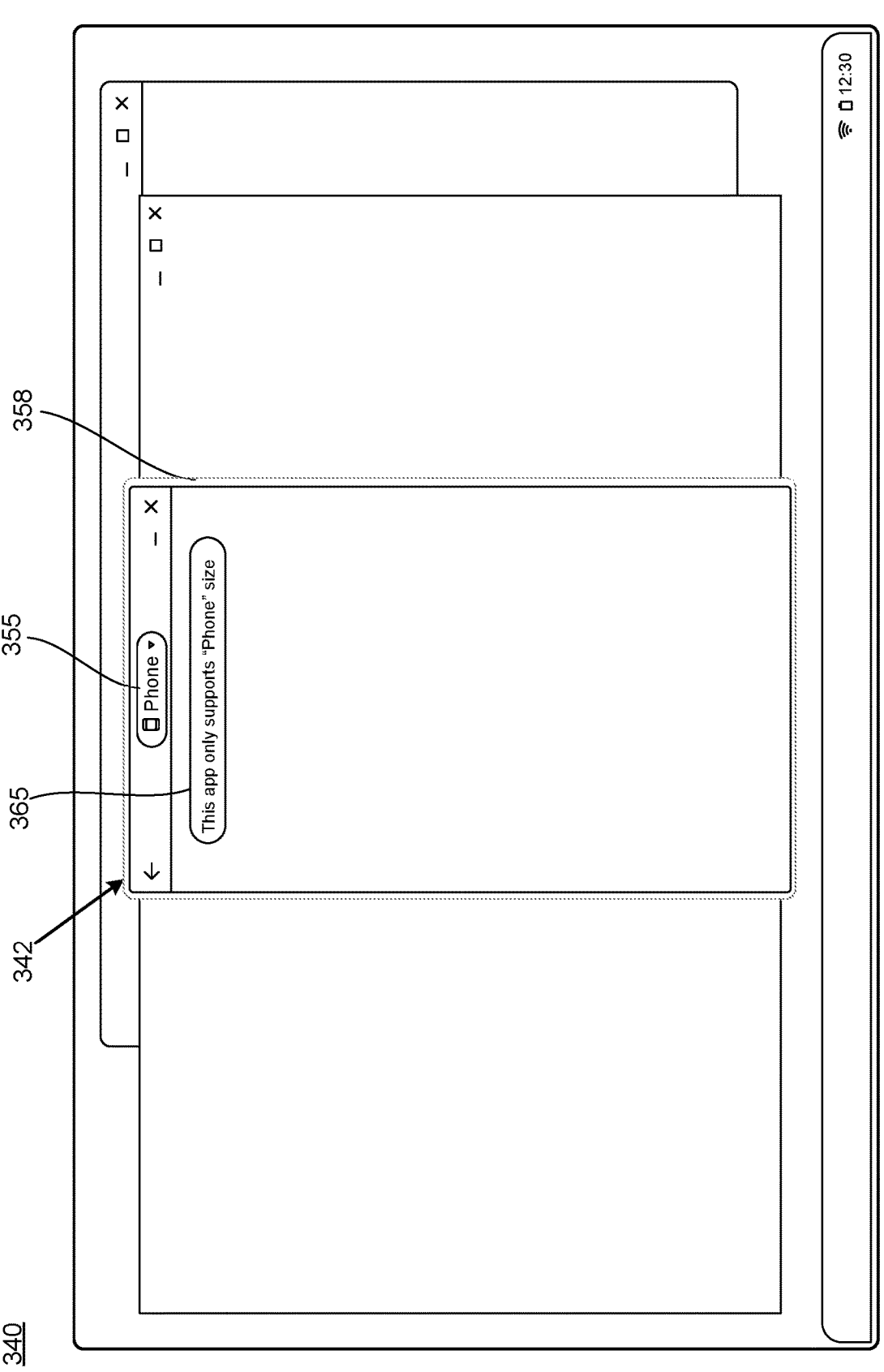

FIG. 3E illustrates a user interface 342 for an application in a compatibility mode where the application only supports one of the predefined resize options according to an aspect. As shown in FIG. 3E, the border area 358 is translucent to indicate that the window resize lock is enabled. Also, the UI element 355 is changed to be not selectable so as to prevent the UI object 364 from being rendered (thereby not providing the user with resize options). Also, a UI object 365 may be rendered on the user interface 342 that provides an indication that the application only supports one type of window size.

Figure 4:
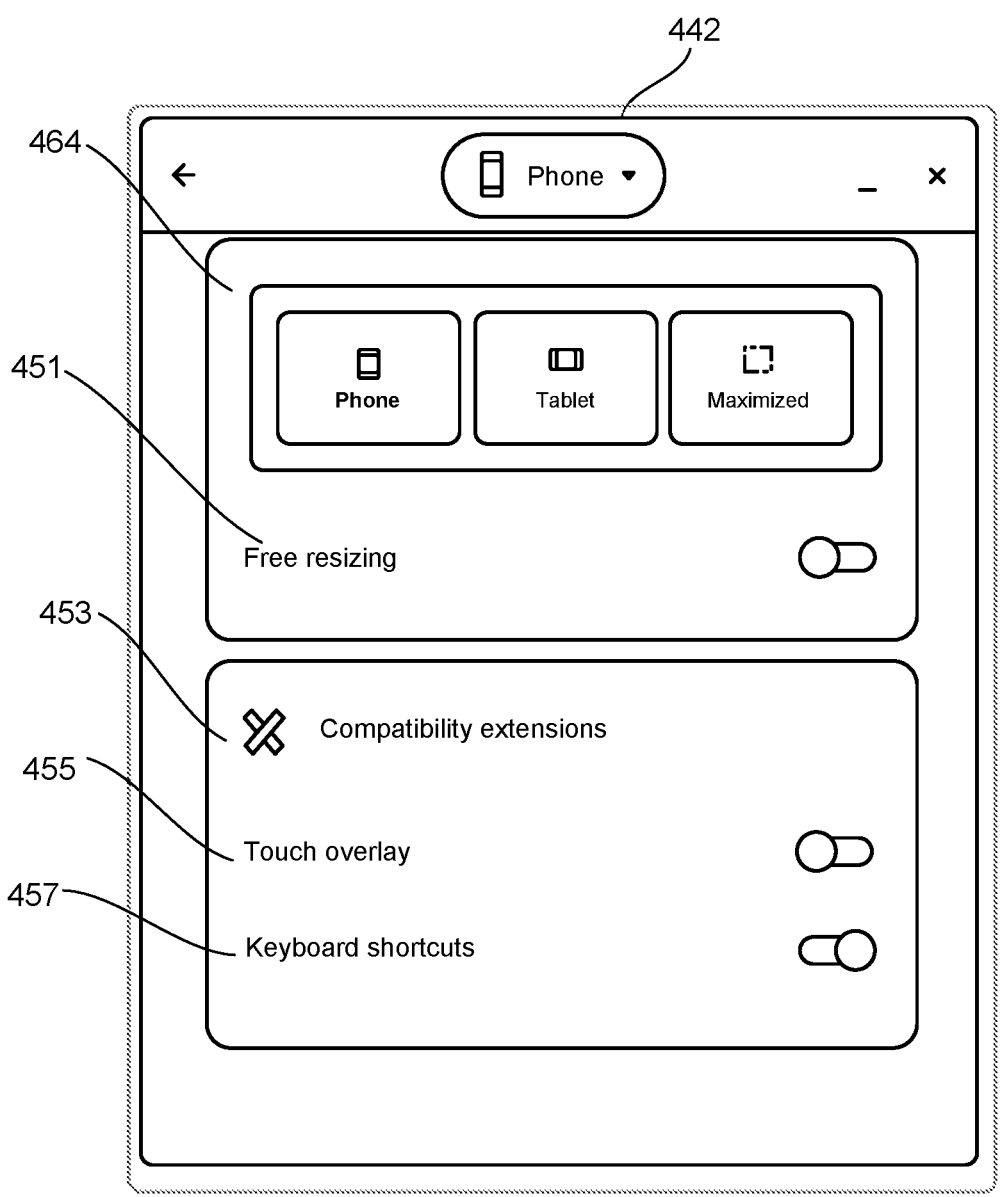
FIG. 4 illustrates a user interface for an application within a compatibility mode according to an aspect.

FIG. 4 illustrates a user interface 442 for an application in a compatibility mode according to an aspect. The user interface 442 provides a UI object 464 that includes a plurality of resizing options (e.g., phone, tablet, maximized). Also, the UI object 464 may include a free resizing option 451. In some examples, the free resizing option 451 is a toggle control. When the free resizing option 451 is selected, the user is able to drag-resize the user interface 442. Also, the user interface 442 may render a compatibility extension interface 453 that provides one or more additional compatibility features. In some examples, the compatibility extension interface 453 includes a touch overlay option 455 and a keyboard shortcuts option 457.

Figure 5A:
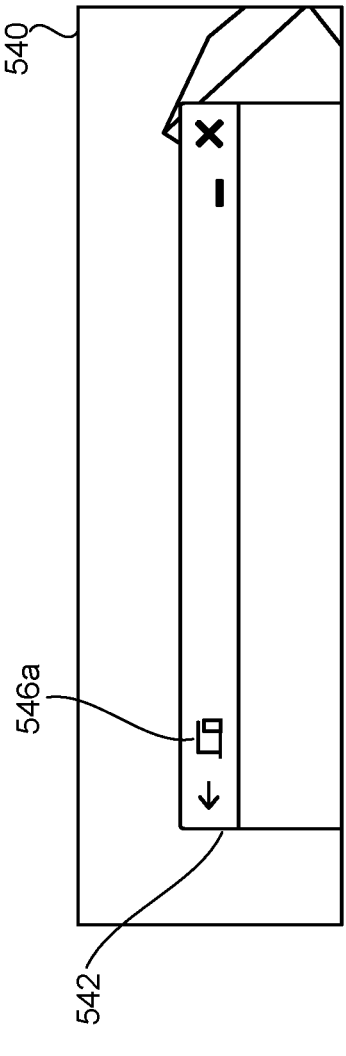
FIGS. 5A through 5D illustrate user interfaces for an application within a compatibility mode according to various aspects.
Figure 5B:
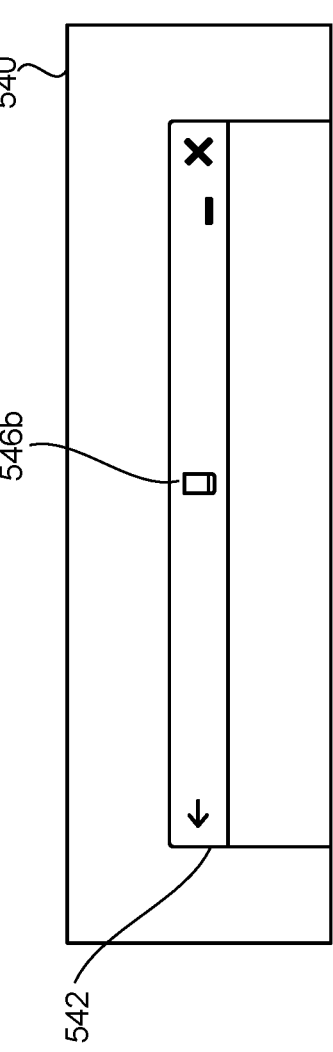
Figures 5C, 5D:
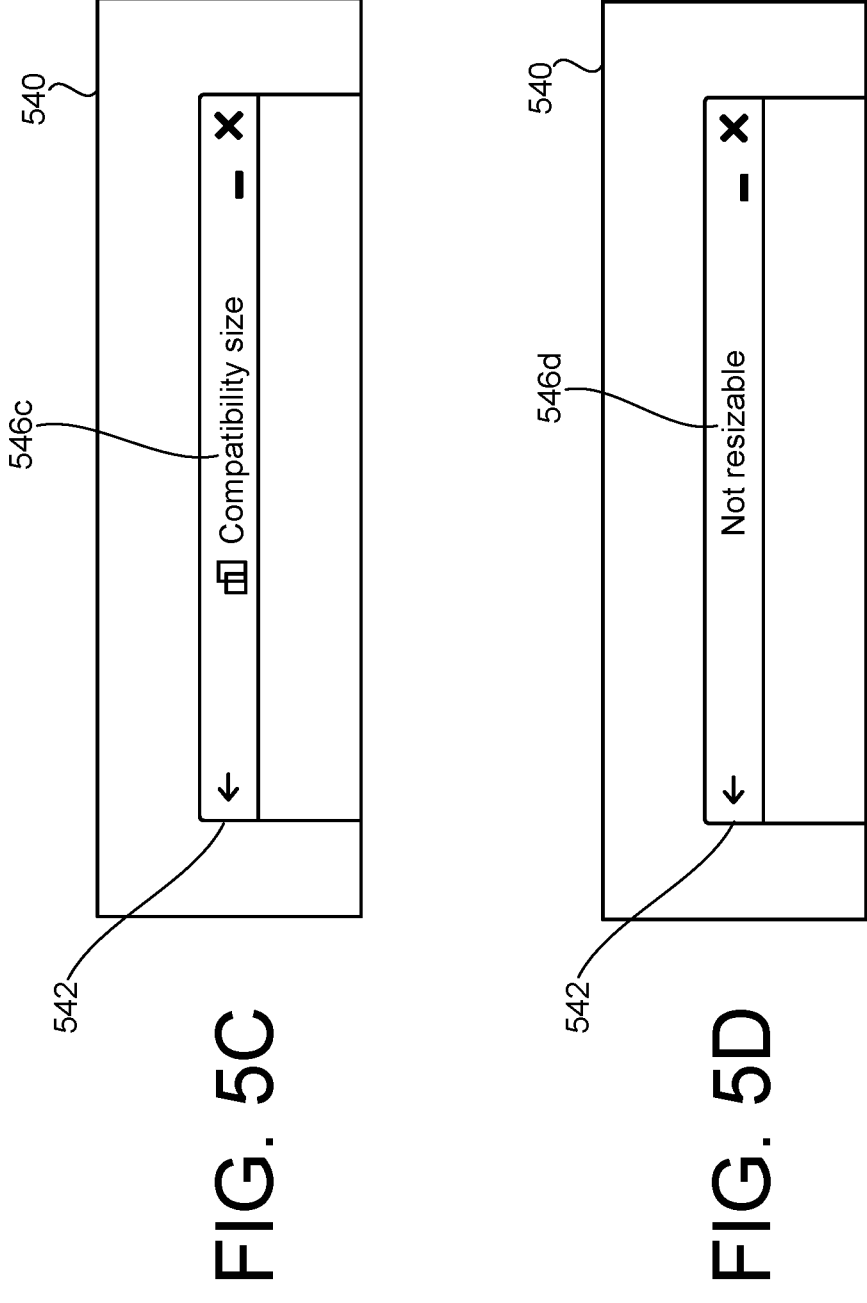
Figure 6A:
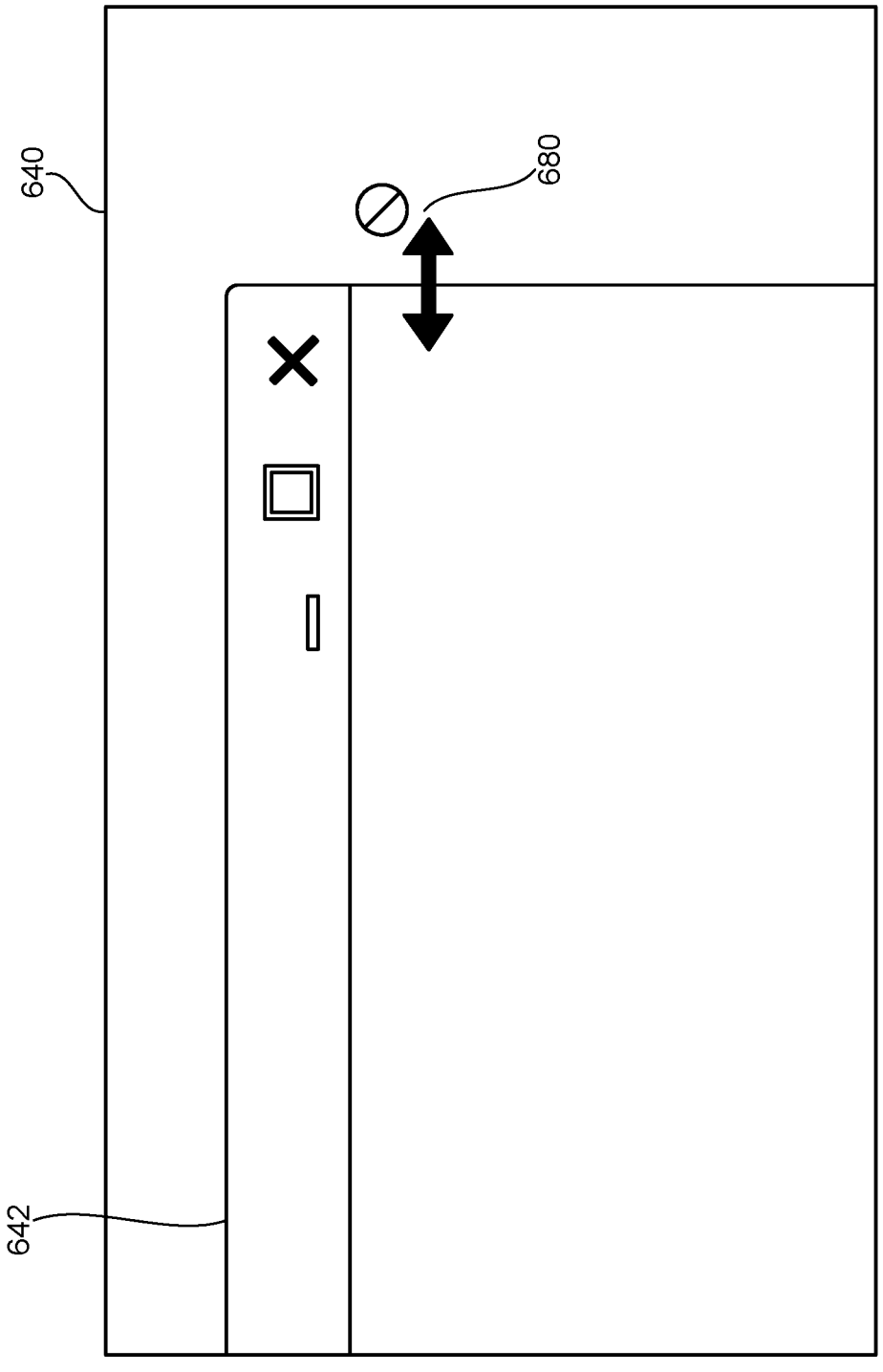
FIGS. 6A through 6E illustrate a cursor icon with respect to an application within a compatibility mode according to various aspects.
Figure 6C:
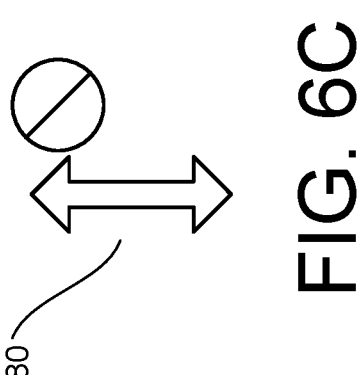
Figure 6E:
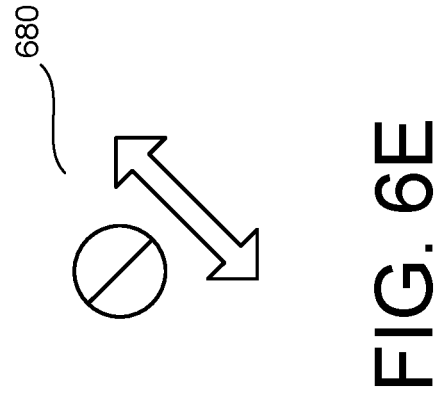
Figure 6B:
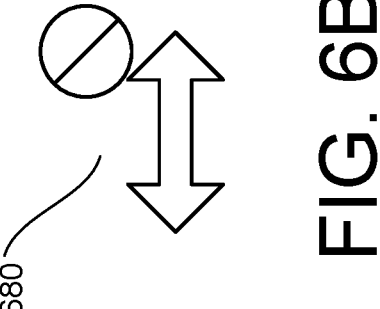
Figure 6D:
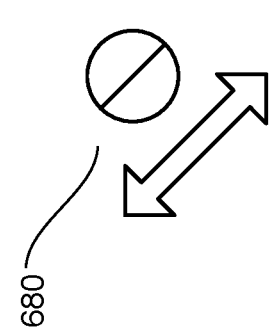

FIGS. 5A through 5D illustrate a user interface 542 rendered on a display 540 that depicts various implementations of compatibility mode indicators according to an aspect. In FIG. 5A, a capability mode indicator 546a is rendered on the user interface 542, where the capability mode indicator 546a is an icon that indicates the application is in the capability mode. In FIG. 5B, a capability mode indicator 546b is rendered on the user interface 542, where the capability mode indicator 546b is another icon that indicates the application is in the capability mode. In FIG. 5C, a capability mode indicator 546c is rendered on the user interface 542, where the capability mode indicator 546c is a label (e.g., compatibility size) that indicates the application is in the capability mode. In FIG. 5D, a capability mode indicator 546d is rendered on the user interface 542, where the capability mode indicator 546d is another label (e.g., not resizable) that indicates the application is in the capability mode.

FIGS. 6A through 6E illustrate a user interface 642 rendered on a display 640 in which a cursor icon is changed to a non-resizability icon 680. For example, a position of a cursor icon is detected on the display 640, and the cursor icon is changed to the non-resizability icon 680 when the position of the cursor is detected within a threshold distance of an edge of the user interface 642.

Figure 7:
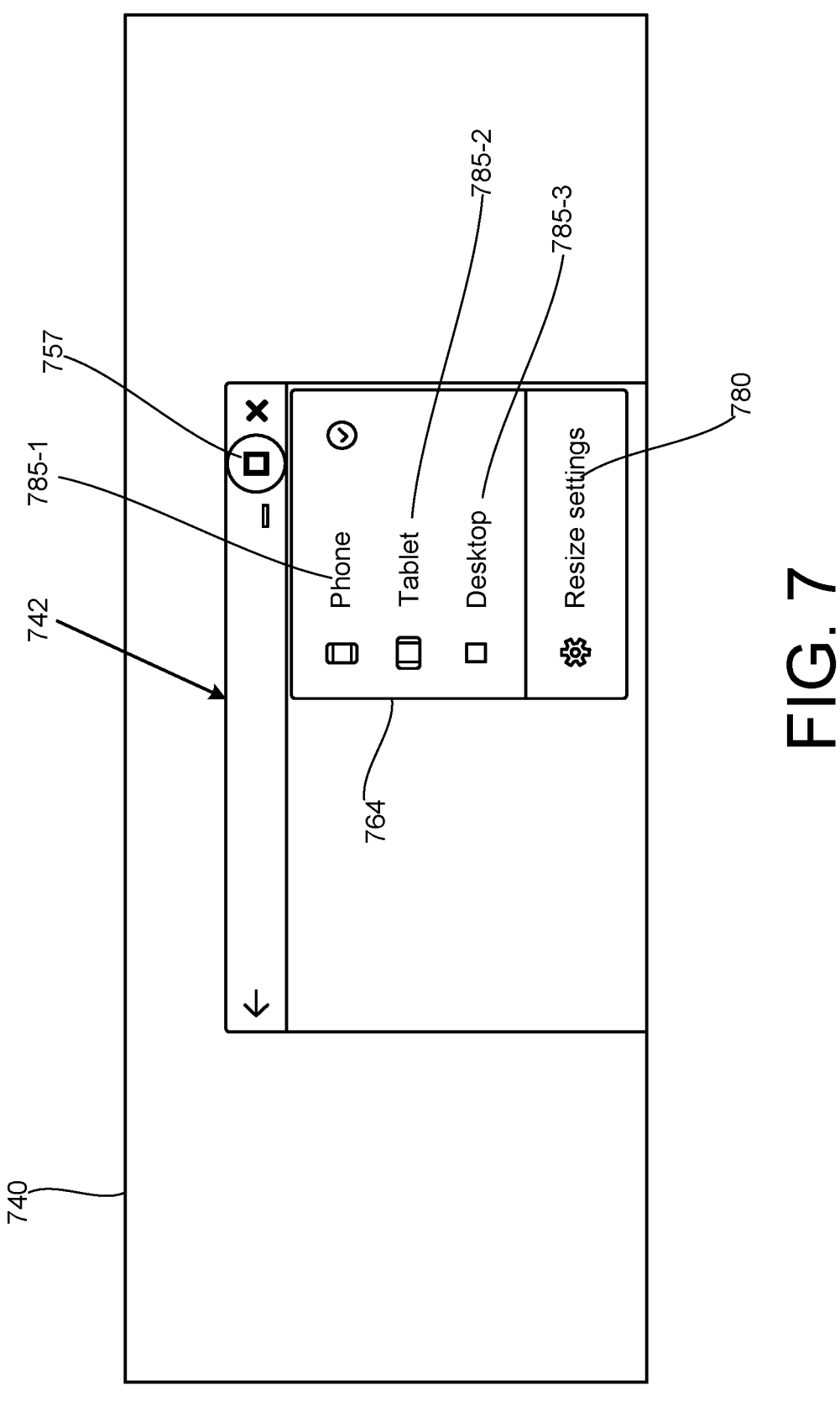
FIG. 7 illustrates a user interface for an application within a compatibility mode according to an aspect.

FIG. 7 illustrates a user interface 742 rendered on a display 740 in which the application is executing in a compatibility mode. For example, in response to attempting to select a maximized icon 757, a UI object 764 is rendered on the user interface 742, where the UI object 764 provides a plurality of predefined resize options (e.g., phone, tablet, desktop). For example, the UI object 764 includes a first resize option 785-1 relating to a phone size, a second resize option 785-2 relating to a tablet size, and a third resize option 785-3 relating to a desktop size. In FIG. 7, the user interface 742 has a size corresponding to the first resize option 785-1. However, the user can select the second resize option 785-2 which causes the user interface 742 to be resized according to the second resize option 785-2. Then, the user can select the third resize option 785-3 which causes the user interface 742 to be resized according to the third resize option 785-3. In some examples, the user interface 742 can only be resized according to the three different options. In some examples, the UI object 764 includes a resize setting link 780 that, when selected, causes an interface to be rendered that provides a selection option to enable or disable the window resize lock. If the window resize lock is disabled, the user interface 742 can be freely resized.

Figure 8:
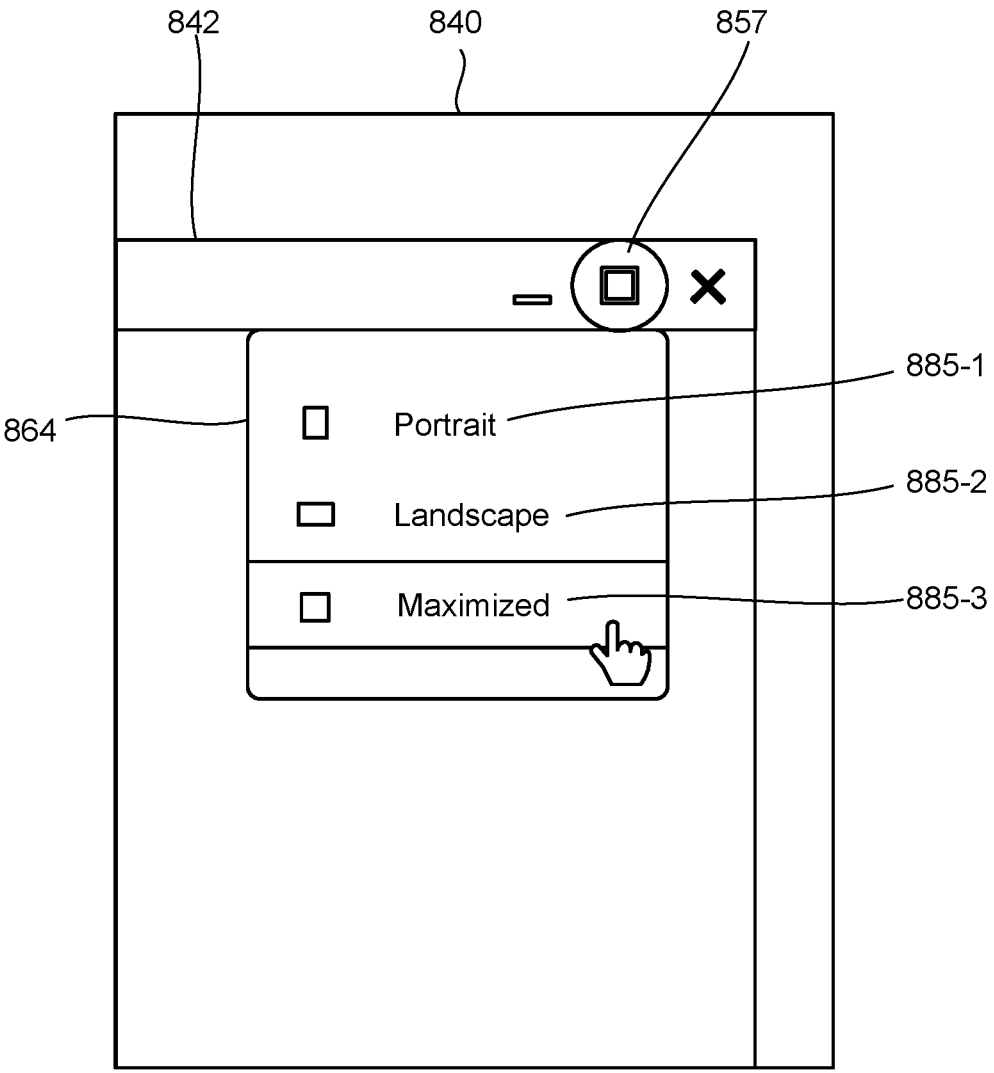
FIG. 8 illustrates a user interface for an application within a compatibility mode according to an aspect.

FIG. 8 illustrates a user interface 842 rendered on a display 840 in which the application is executing in a compatibility mode. For example, in response to receipt of a selection of a maximized icon 857, a UI object 864 is rendered on the user interface 842, where the UI object 864 provides a plurality of predefined resize option (e.g., phone, tablet, maximized). For example, the UI object 864 includes a first resize option 885-1 relating to a portrait size, a second resize option 885-2 relating to a landscape size, and a third resize option 885-3 relating to a maximized size. In some examples, the user interface 842 can only be resized according to the three different options.

Figures 9, 10:
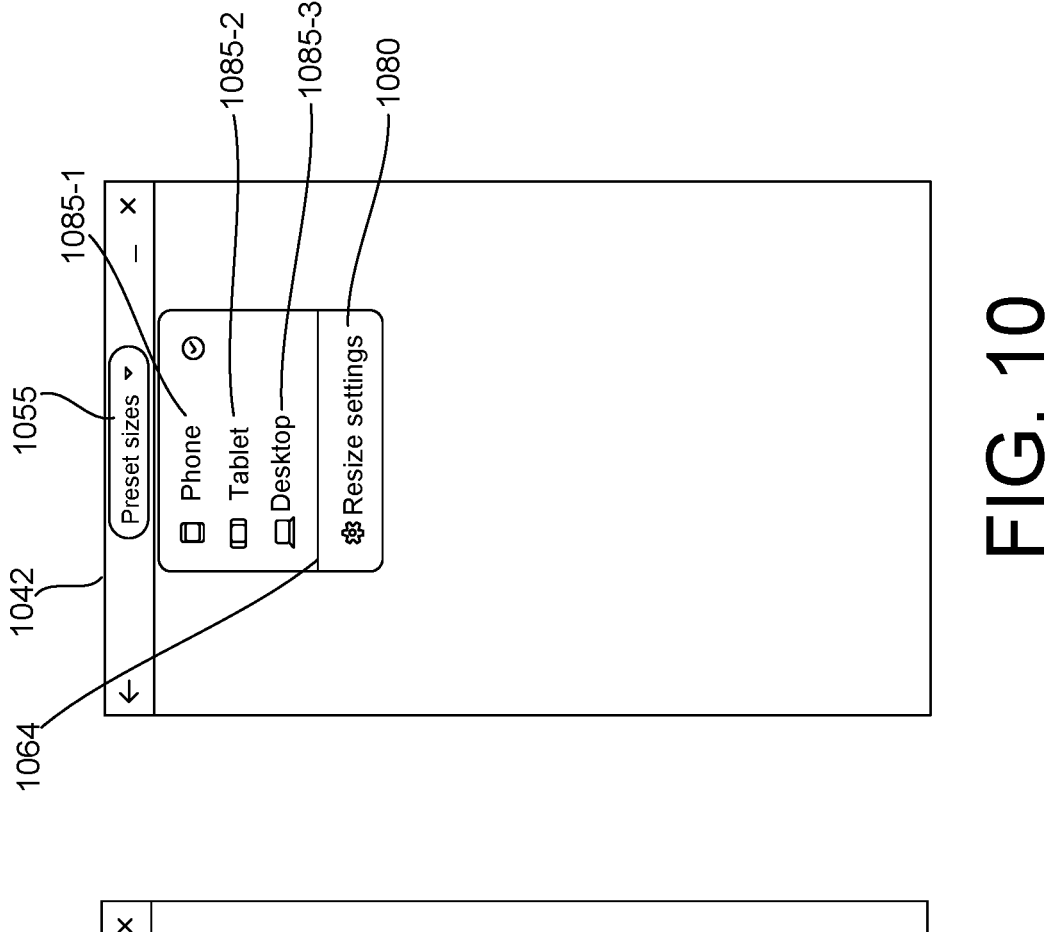
FIG. 9 illustrates a user interface for an application within a compatibility mode according to an aspect.
FIG. 10 illustrates a user interface for an application within a compatibility mode according to an aspect.

FIG. 9 illustrates a user interface 942 in which an application is executing in a compatibility mode. The user interface 942 includes a UI element 955 that, when selected, provides a UI object 964 in the form of a drop-down menu. The UI object 964 includes a plurality of predefined resize options (e.g., phone, tablet, desktop). For example, the UI object 964 includes a first resize option 985-1 relating to a phone size, a second resize option 985-2 relating to a tablet size, and a third resize option 985-3 relating to a desktop size. The user interface 942 may be resized according to the three different options. Also, the UI object 964 may include a selectable option 951 to enable or disable free resizing. For example, when free resizing is disabled, the user interface 942 can only be resized according to the three different options. However, when free resizing is enabled, the user interface 942 can be freely resized.

FIG. 10 illustrates a user interface 1042 in which an application is executing in a compatibility mode according to another aspect. The user interface 1042 includes a UI element 1055 that, when selected, provides a UI object 1064 in the form of a drop-down menu. The UI object 1064 includes a plurality of predefined resize options (e.g., phone, tablet, desktop). For example, the UI object 1064 includes a first resize option 1085-1 relating to a phone size, a second resize option 1085-2 relating to a tablet size, and a third resize option 1085-3 relating to a desktop size. The user interface 1042 may be resized according to the three different options. Also, the UI object 1064 may include a resize setting link 1080 that, when selected, causes an OS setting interface to be rendered on the display, where the OS setting interface includes a selectable resize setting to enable or disable the window resize lock.

Figure 11:
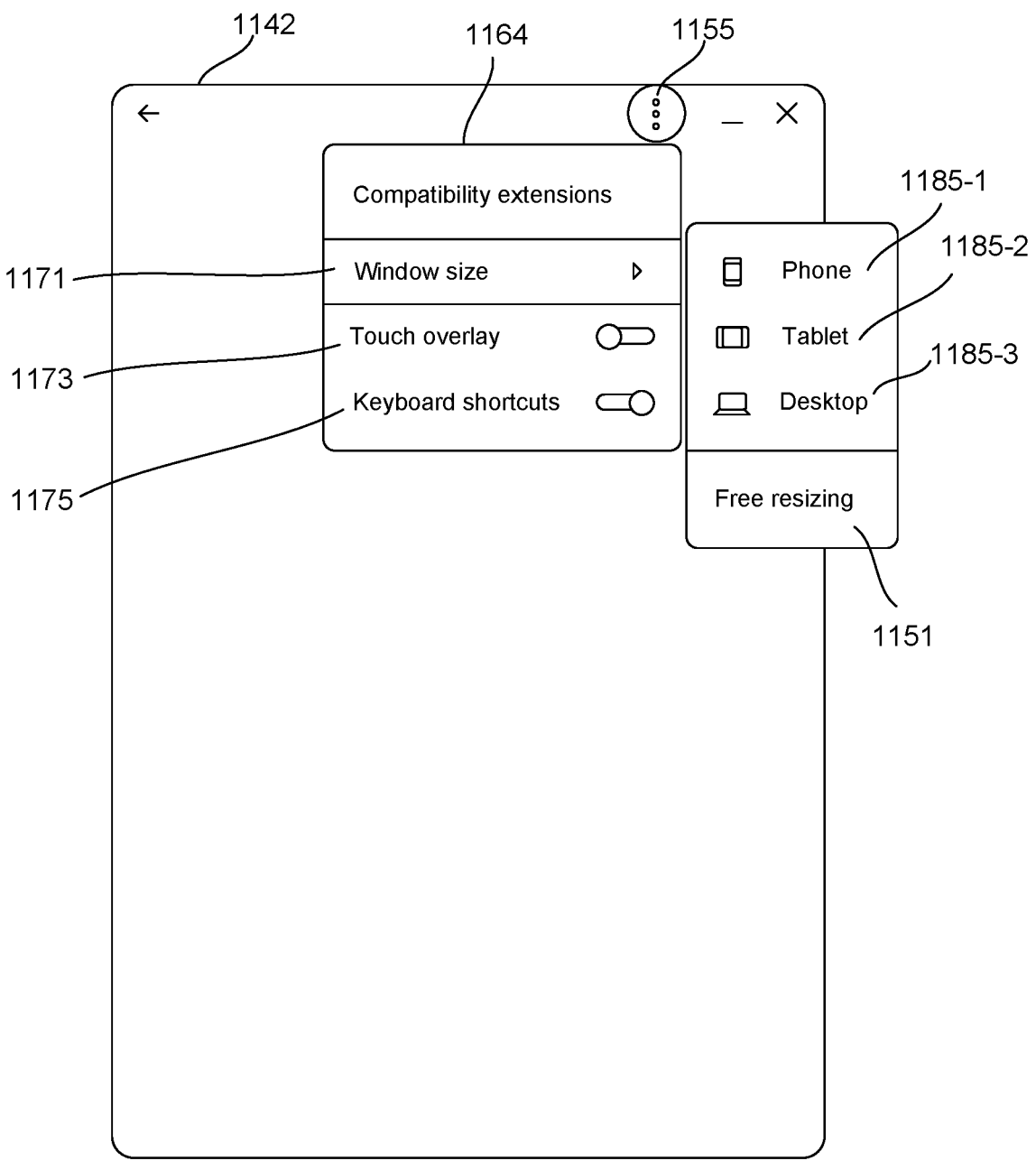
FIG. 11 illustrates a user interface for an application within a compatibility mode according to an aspect.

FIG. 11 illustrates a user interface 1142 in which an application is executing in a compatibility mode according to another aspect. The user interface 1142 includes a UI element 1155 that, when selected, provides a UI object 1164 in the form of a drop-down menu. The UI object 1164 may define a plurality of compatibility features (e.g., compatibility extensions). In some examples, the UI object 1164 includes UI elements that enable the user to select a window size 1171, whether or not to enable touch overlay 1173, and/or whether or not to enable keyboard shortcuts 1175. In some examples, in response to receipt of the window size 1171, the UI object 1164 may provide a plurality of resize options that can be selected by the user. For example, the UI object 1164 includes a first resize option 1185-1 relating to a phone size, a second resize option 1185-2 relating to a tablet size, and a third resize option 1185-3 relating to a desktop size. Also, the UI object 1164 may include a selectable option 1151 to enable or disable free resizing (or a link to a setting interface to enable or disable free resizing). For example, when free resizing is disabled, the user interface 1142 can only be resized according to the three different options. However, when free resizing is enabled, the user interface 1142 can be freely resized.

Figure 12:
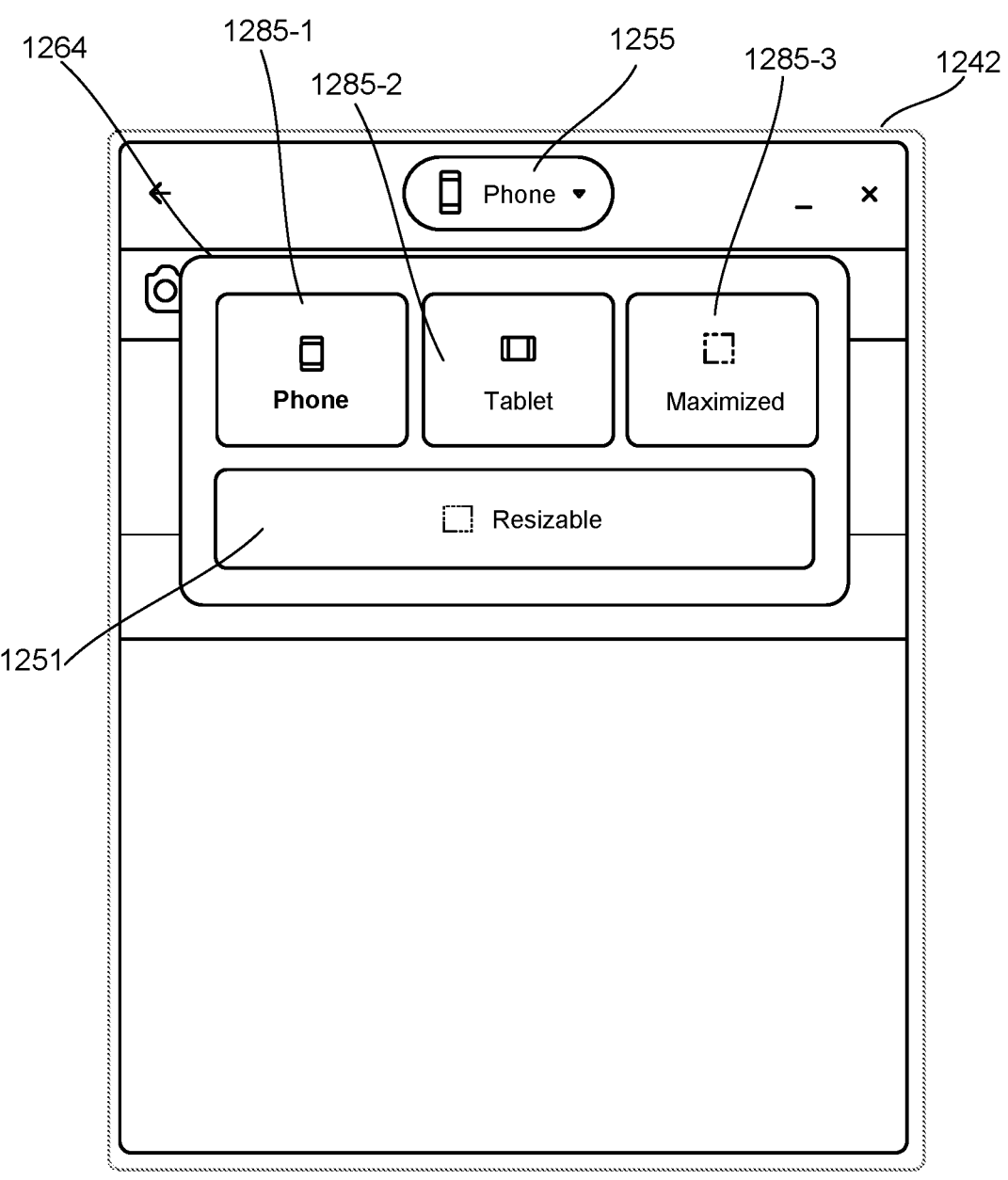
FIG. 12 illustrates a user interface for an application within a compatibility mode according to an aspect.

FIG. 12 illustrates a user interface 1242 in which an application is executing in a compatibility mode according to another aspect. The user interface 1242 includes a UI element 1255 that, when selected, provides a UI object 1264 in the form of a drop-down menu. The UI object 1264 may provide a plurality of resize options (e.g., phone, tablet, maximized) that can be selected by the user. For example, the UI object 1264 includes a first resize option 1285-1 relating to a phone size, a second resize option 1285-2 relating to a tablet size, and a third resize option 1285-3 relating to a desktop size. Also, the UI object 1264 may include a selectable option 1251 to enable or disable free resizing (e.g., drag-resizing). For example, when free resizing is disabled, the user interface 1242 can only be resized according to the three different options. However, when free resizing is enabled, the user interface 1242 can be freely resized.

Figure 13:
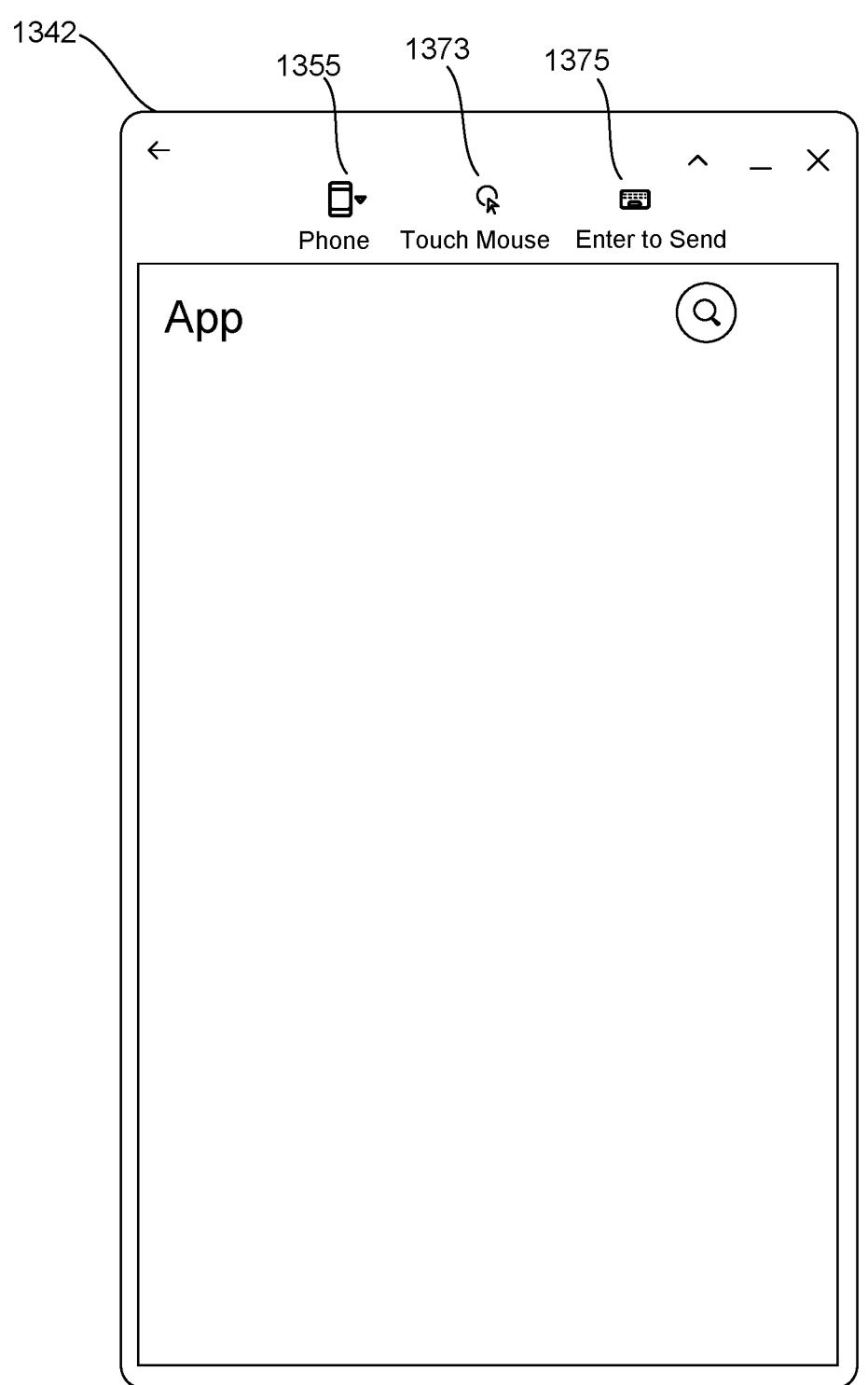
FIG. 13 illustrates a user interface for an application within a compatibility mode according to an aspect.

FIG. 13 illustrates a user interface 1342 in which an application is executing in a compatibility mode according to another aspect. The user interface 1342 includes a UI element 1355 that, when selected, provides a plurality of resizing options. For example, in FIG. 13, the phone size is selected, but the user may have the ability to select other sizes (e.g., tablet, desktop, maximized, etc.). Also, the user interface 1342 includes a selectable control 1373 to enable or disable touch mouse. Also, the user interface 1342 includes a selectable control 1375 to enable a hotkey such as using the "enter" button on the keyboard to send a message.

Figure 14:
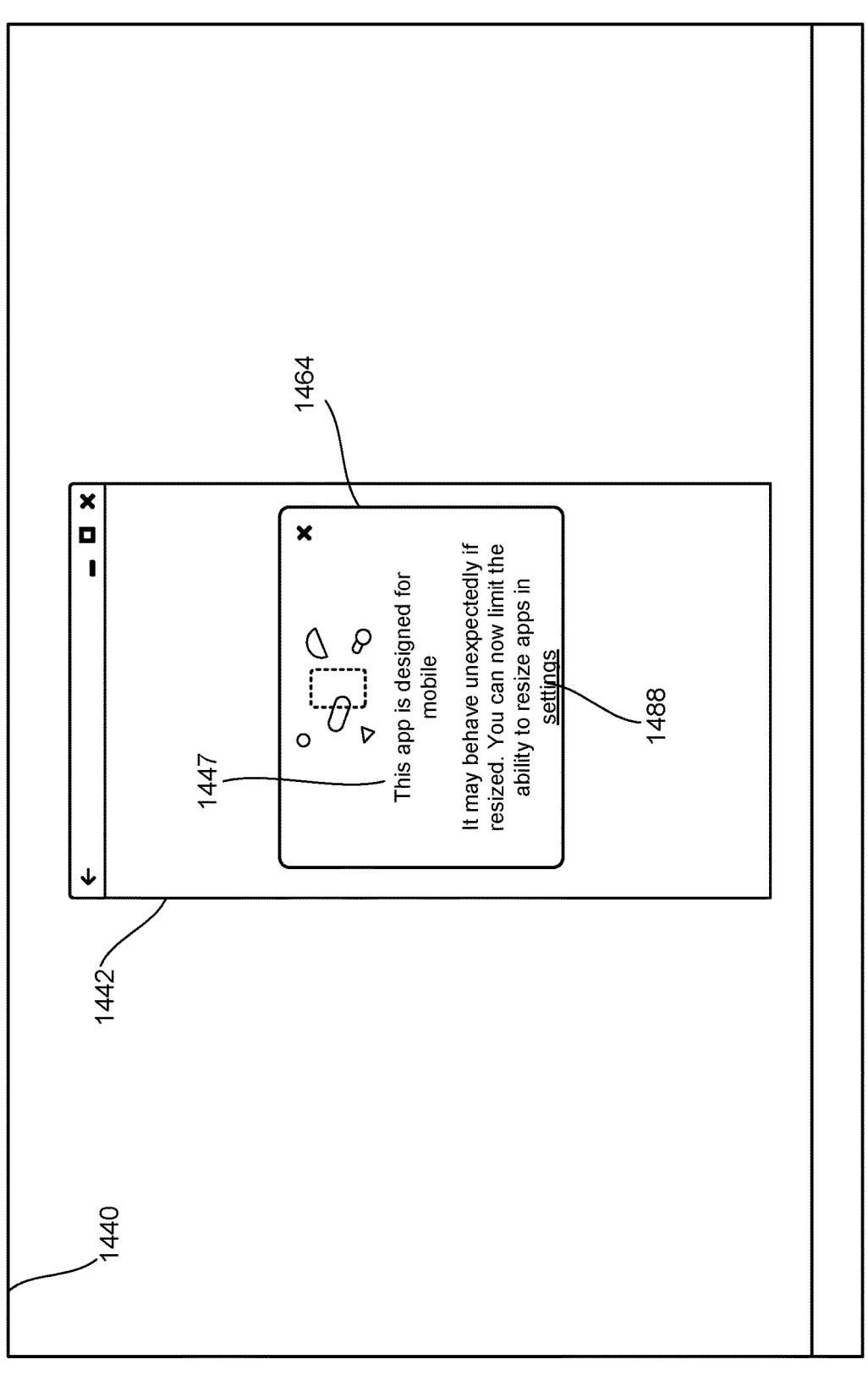
FIG. 14 illustrates a user interface for an application within a compatibility mode according to an aspect.

FIG. 14 illustrates a user interface 1442 rendered on a display 1440 in which the application is executing in a compatibility mode. In response to the application being launched in the compatibility mode, the user interface 1442 may display a UI object 1464 (e.g., a splash UI screen) with a resizing disabled indicator 1447 that indicates that free resizing is disabled (and that enabling free resizing may cause the application to suddenly terminate). In some examples, the UI object 1464 includes a resize setting link 1488 that, when selected, causes an OS setting interface to be rendered in order to enable or disable the window resize lock.

Figure 15:
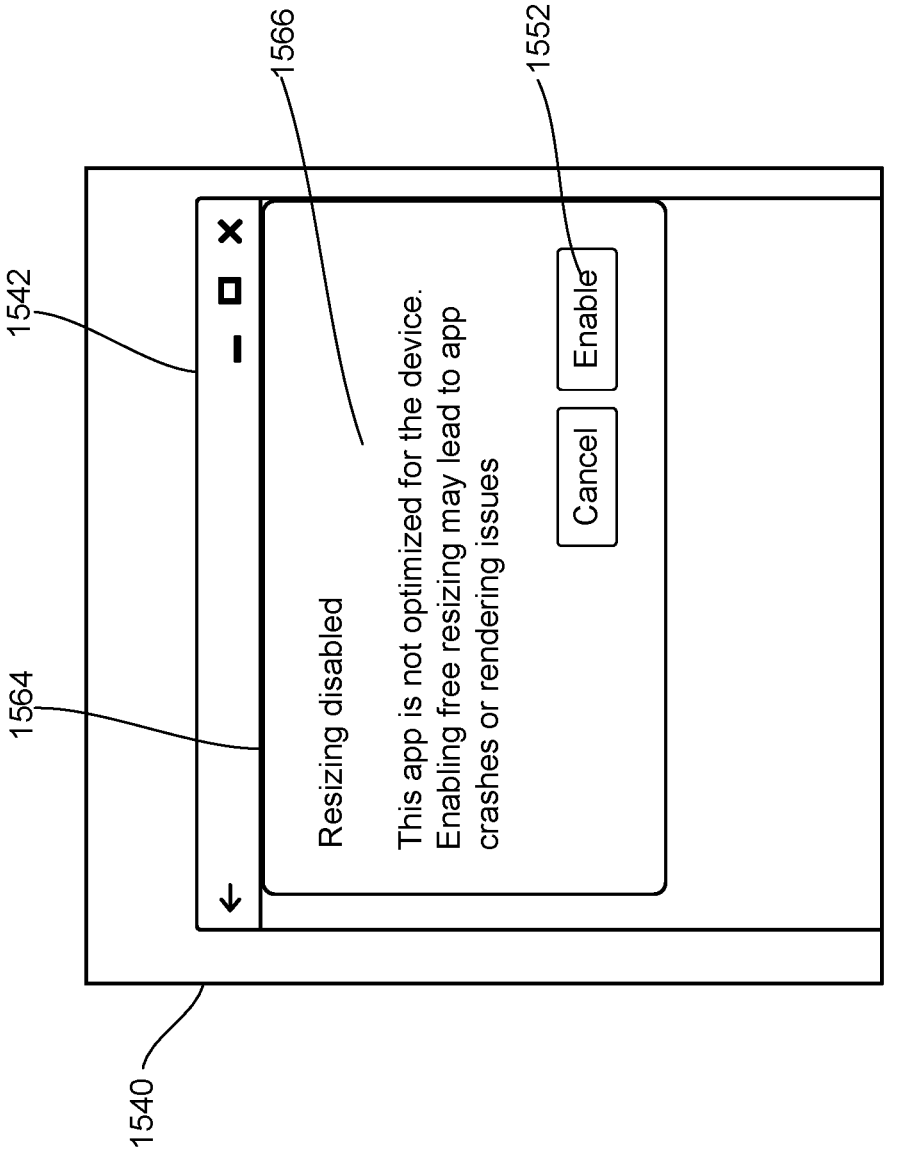
FIG. 15 illustrates a user interface for an application within a compatibility mode according to an aspect.

FIG. 15 illustrates a user interface 1542 rendered on a display 1540 in which the application is executing in a compatibility mode. In response to the application being launched in the compatibility mode, the user interface 1542 may display a UI object 1564 (e.g., a splash UI screen) with a resizing disabled indicator 1566 that indicates that free resizing is disabled (and that enabling free resizing may cause the application to suddenly terminate). In some examples, the UI object 1464 includes a selectable option 1552 to enable free resizing.

Figure 16:
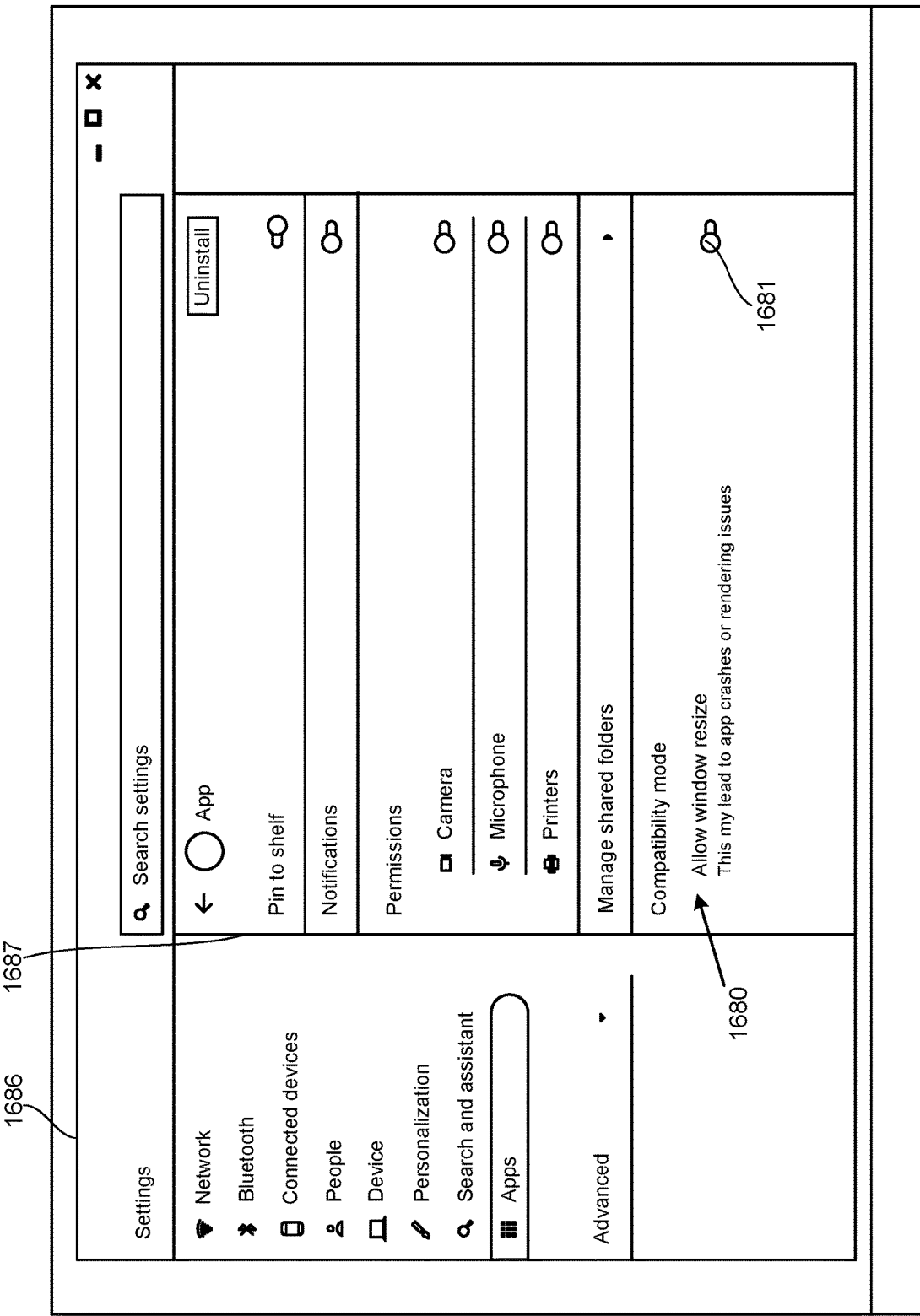
FIG. 16 illustrates an operating system setting interface according to an aspect.

FIG. 16 illustrates an OS setting interface 1686 that includes a resize setting 1680. For example, the resize setting 1680 may enable the user to enable or disable the window resize lock (e.g., free resizing). In some examples, the resize setting 1680 is provided in a per-app setting interface 1687 that also provides other settings associated with the application. In some examples, the resize setting 1680 includes a slider control 1681 to enable or disable the window resize lock. However, the resize setting 1680 may define any type of UI control such as a selectable button, a toggle switch, etc.

Figures 17A, 17B:
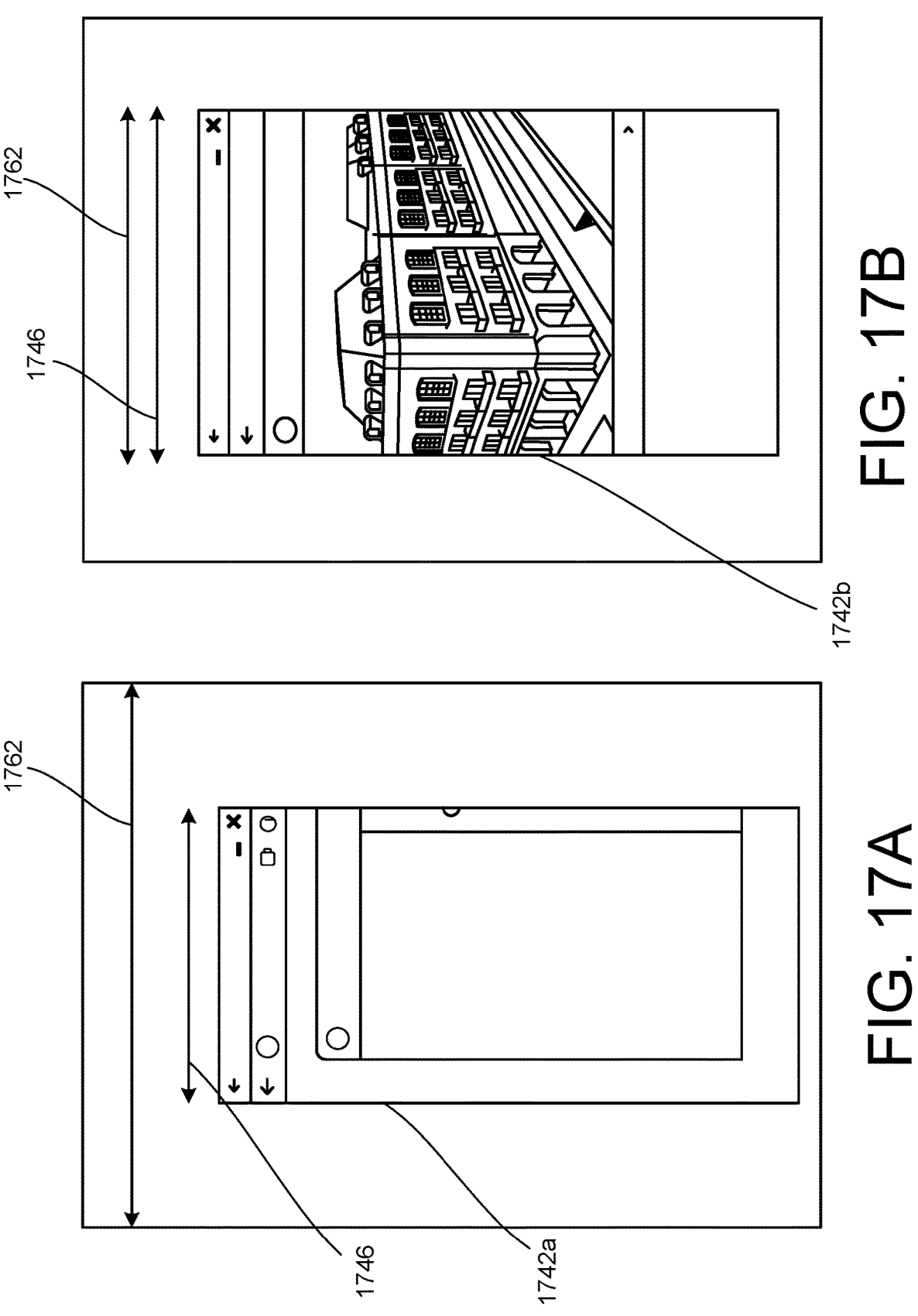
FIG. 17A illustrates a user interface for an application in which the compatibility mode is deactivated according to an aspect.
FIG. 17B illustrates a user interface for an application in which the compatibility mode is activated according to an aspect.

FIG. 17A illustrates a user interface 1742a of a non-optimized application that is not operating in a compatibility mode. FIG. 17B illustrates a user interface 1742b of a non-optimized application that is operating in a compatibility mode. In some examples, as shown in FIG. 17A, a display size 1762 and a window size 1746 may be different. For example, some mobile applications execute in a maximized layout in a mobile environment. However, when the mobile application executes on a larger display, some application developers may not have accounted for the difference in layouts between the display and the window size. As shown in FIG. 17A, the display size 1762 (e.g., the display width) is larger than the window size 1746 (e.g., the window width). However, as shown in FIG. 17B, when the compatibility mode is activated, a window manager may adjust a display size 1762 from the point of view of the application to correspond to the window size 1746. The display size 1762 may be the width and/or the height of the text and graphics of the application that are displayed on the display. In some examples, the window manager may decrease the display size 1762 to correspond to the window size 1746 of the user interface 1742b.

Figure 18:
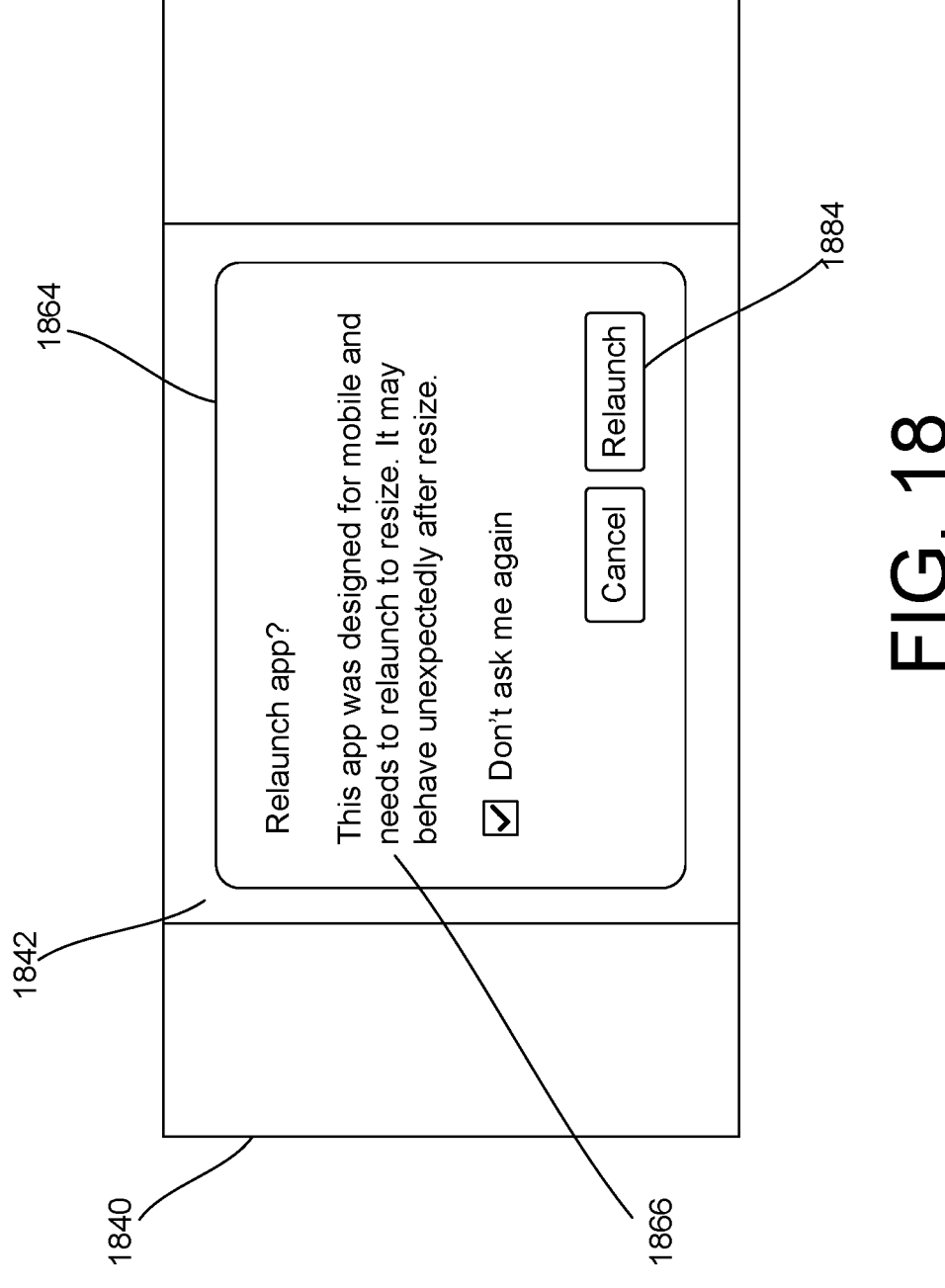
FIG. 18 illustrates a user interface for an application within a compatibility mode according to an aspect.

FIG. 18 illustrates a user interface 1842 rendered on a display 1840 in which the application is executing in a compatibility mode. The user interface 1842 may display a UI object 1864 (e.g., a splash UI screen) with a resizing disabled indicator 1866 that indicates that free resizing is disabled (and that enabling free resizing may cause the application to suddenly terminate). In some examples, the window manager may receive a resize request to resize the user interface 1842. In response to the resize request, the UI object 1864 is rendered, where the UI object 1864 includes a relaunch indicator 1884 to relaunch the application. Then, in response to receipt of a selection to the relaunch indicator 1884, the window manager may relaunch the application such that the user interface 1842 is resized on the display 1840 according to the resize request. This allows for resizing of applications which do not otherwise support dynamic resizing. Performance of the application may therefore be improved.

Figure 19:
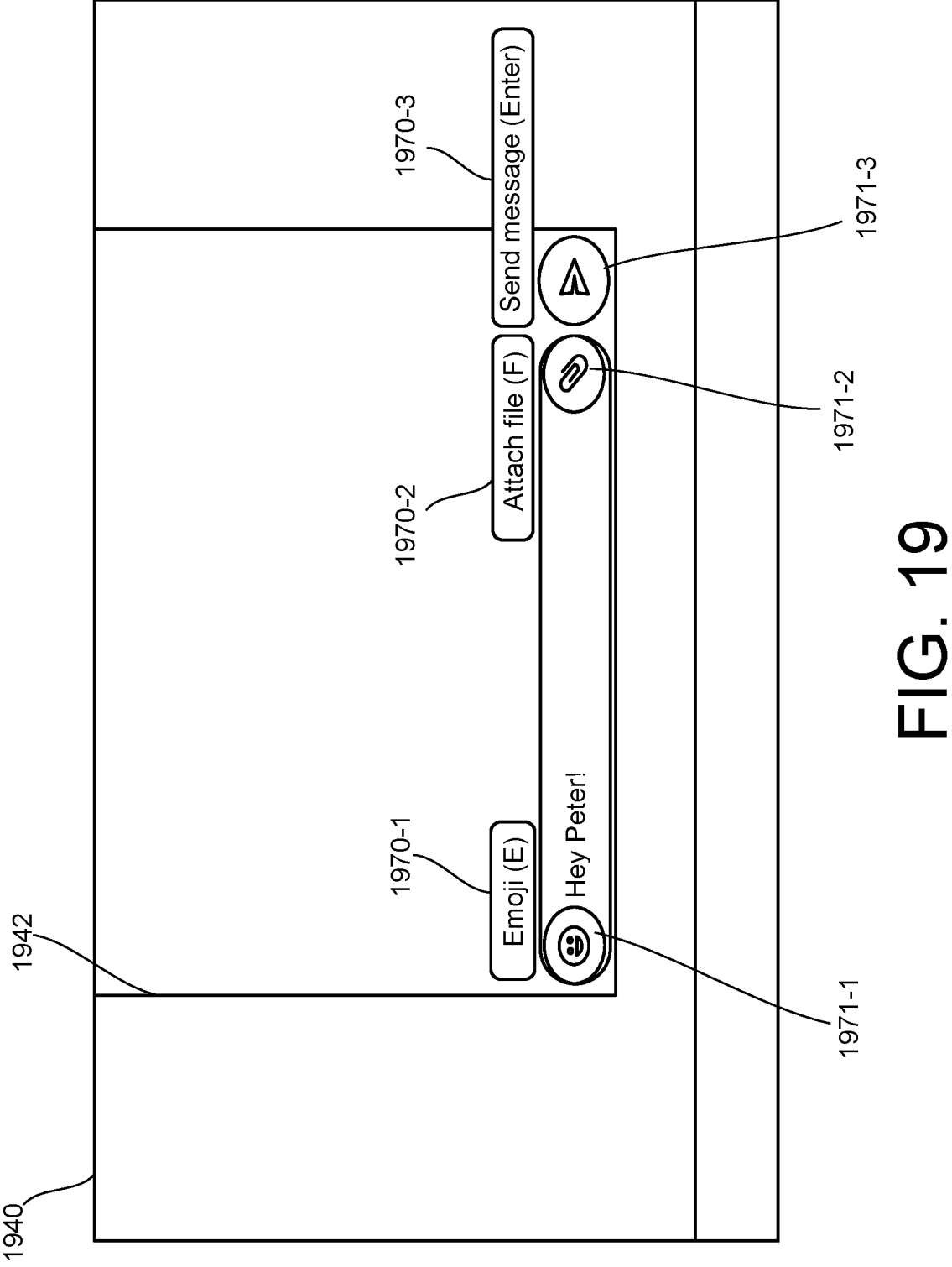
FIG. 19 illustrates a user interface for an application within a compatibility mode according to an aspect.

FIG. 19 illustrates a user interface 1942 rendered on a display 1940 in which the application is executing in a compatibility mode. When the application is in the compatibility mode, a window manager may enable one or more hotkeys (e.g., 1970-1, 1970-2, 1970-3, etc.) to implement features (e.g., 1971-1, 1971-2, 1971-3, etc.) associated with the application. In some examples, the features (e.g., 1971-1, 1971-2, 1971-3, etc.) may be touch features when the application executes in a mobile environment. In some examples, the feature 1971-1, the feature 1971-2, and the feature 1971-3 are selectable controls that are touch commands in a mobile environment. In some examples, the feature 1971-1 is a touch command to insert an emoji. In some examples, the feature 1971-2 is a touch command to attach a file. However, when the application is in the compatibility mode, a window manager may attach hotkeys to execute the features 1971-1, 1971-2, and 1971-3. For example, a window manager may implement a hotkey 1970-1 (e.g., "E" for attaching an emoji), a hotkey 1970-2 (e.g., "F" to attach a file), and a hotkey 1970-3 (e.g., "enter" to send a message).

Figure 20:
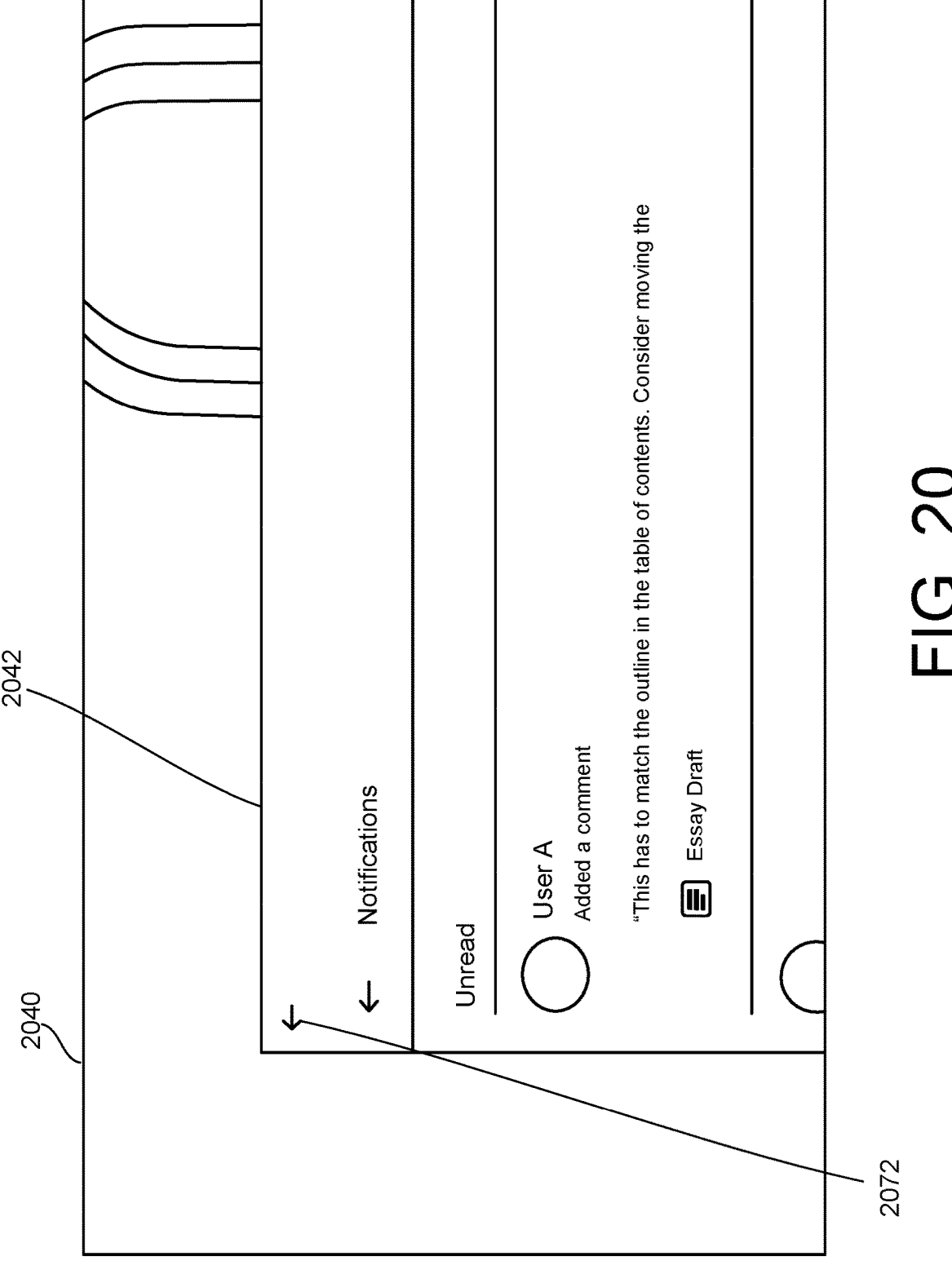
FIG. 20 illustrates a user interface for an application within a compatibility mode according to an aspect.

FIG. 20 illustrates a user interface 2042 rendered on a display 2040 in which the application is executing in a compatibility mode. In some examples, when the application is in the compatibility mode, the window manager may adjust, add, or delete one or more UI controls 2072 associated with the user interface 2042 of the application. For example, when the application executes on an operating system for which it is not optimized to execute, the user interface 2042 may provide one or more UI controls 2072 that are either redundant, not applicable, and/or insufficient to properly navigate the application. In some examples, the UI control 2072 includes a back navigation button. In some examples, the window manager may remove the UI control 2072 that may cause confusion to the user when rendered in the user interface 2042.

Figure 21:
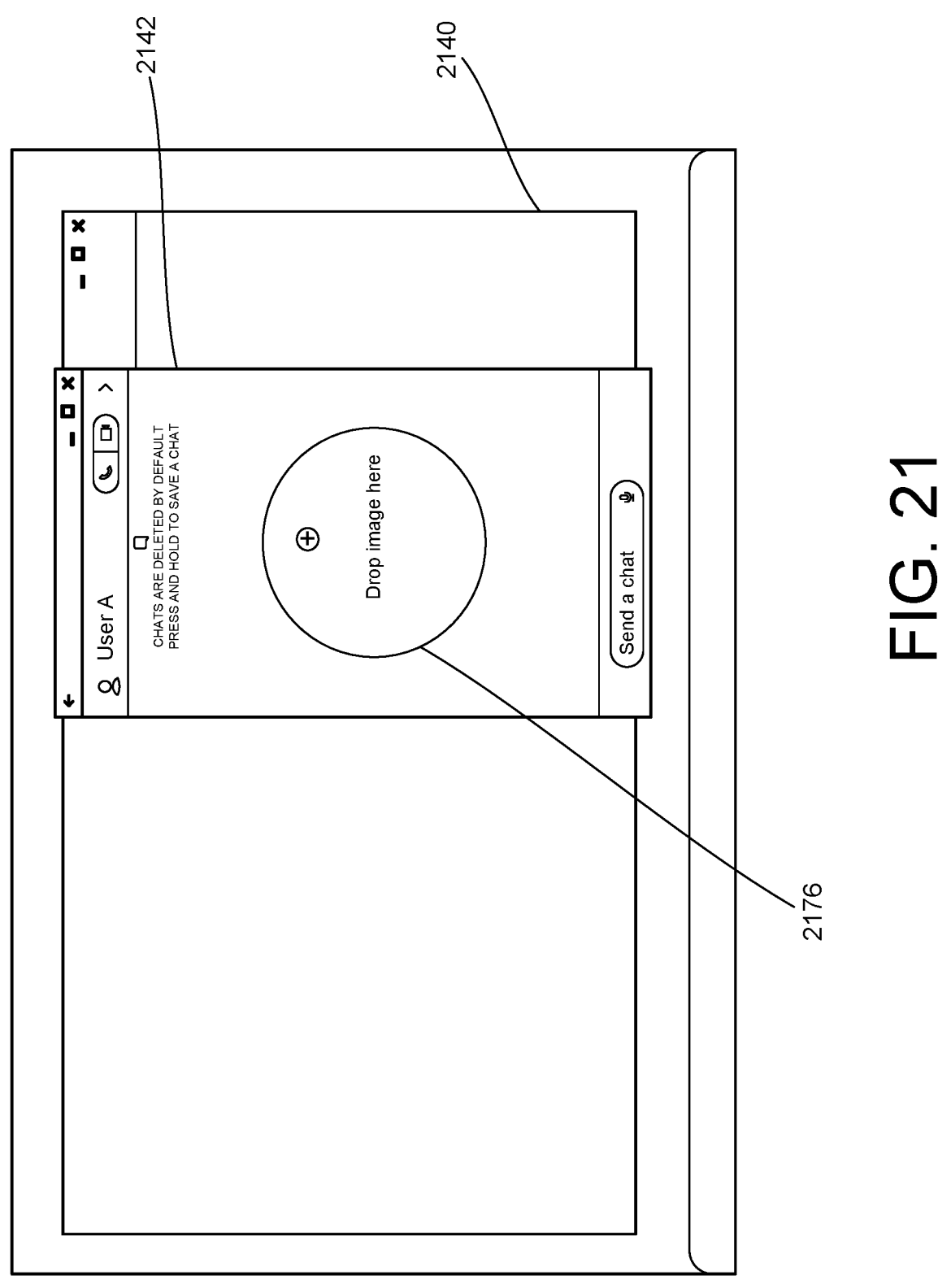
FIG. 21 illustrates a user interface for an application within a compatibility mode according to an aspect.

FIG. 21 illustrates a user interface 2142 rendered on a display 2140 in which the application is executing in a compatibility mode. When the application is in the compatibility mode, a window manager may enable a drag-and-drop feature 2176. The drag-and-drop feature 2176 may be a UI feature that allows the user to select a file or image and drag it into a drop area using a mouse so that the file or image can be received by the application.

FIG. 22 is a flowchart 2200 depicting example operations of a computing device according to an aspect. Although the flowchart 2200 of FIG. 22 is explained with respect to the system 100 of FIGS. 1A through 1D, the flowchart 2200 may be applicable to any of the embodiments discussed herein. Although the flowchart 2200 of FIG. 22 illustrates the operations in sequential order, it will be appreciated that this is merely an example, and that additional or alternative operations may be included. Further, operations of FIG. 22 and related operations may be executed in a different order than that shown, or in a parallel or overlapping fashion.

Operation 2202 includes installing an application 110 on a computing device 120. Operation 2204 includes determining whether to activate a compatibility mode 113 for the application 110. Operation 2206 includes, in response to activating the compatibility mode 113, determining a restriction to a change to an application window size of a user interface 142 of the application 110. Operation 2208 includes rendering a user interface object 164 defining a plurality of predefined sizing options 185 for the user interface 142 of the application 110. In some examples, the rendering of a UI object 164 defining a plurality of predefined sizing options 185 for the application 110 is in response (or responsive) to determining a restriction to a change to the application window size of the user interface 142 of the application 110. For example, after it is determined that there should be a restriction on changes to the application window size, the user interface object 164 defining a plurality of predefined sizing options 185 can be rendered (for output or display to a user). These predefined sizing options 185 can represent one or more changes to a display dimension which are allowed under the determined restriction. In some examples, the predefined sizing options 185 may be based on the determined restriction to a change to the application window size. Rendering the UI object 164 with a predefined or predetermined sizing option (e.g., window size) can reduce application instability and/or reduce rendering issues on the computing device 120 during the resize operation and/or during subsequent execution of the application 110 at the computing device 120. Application performance may therefore be improved.

Figure 23:
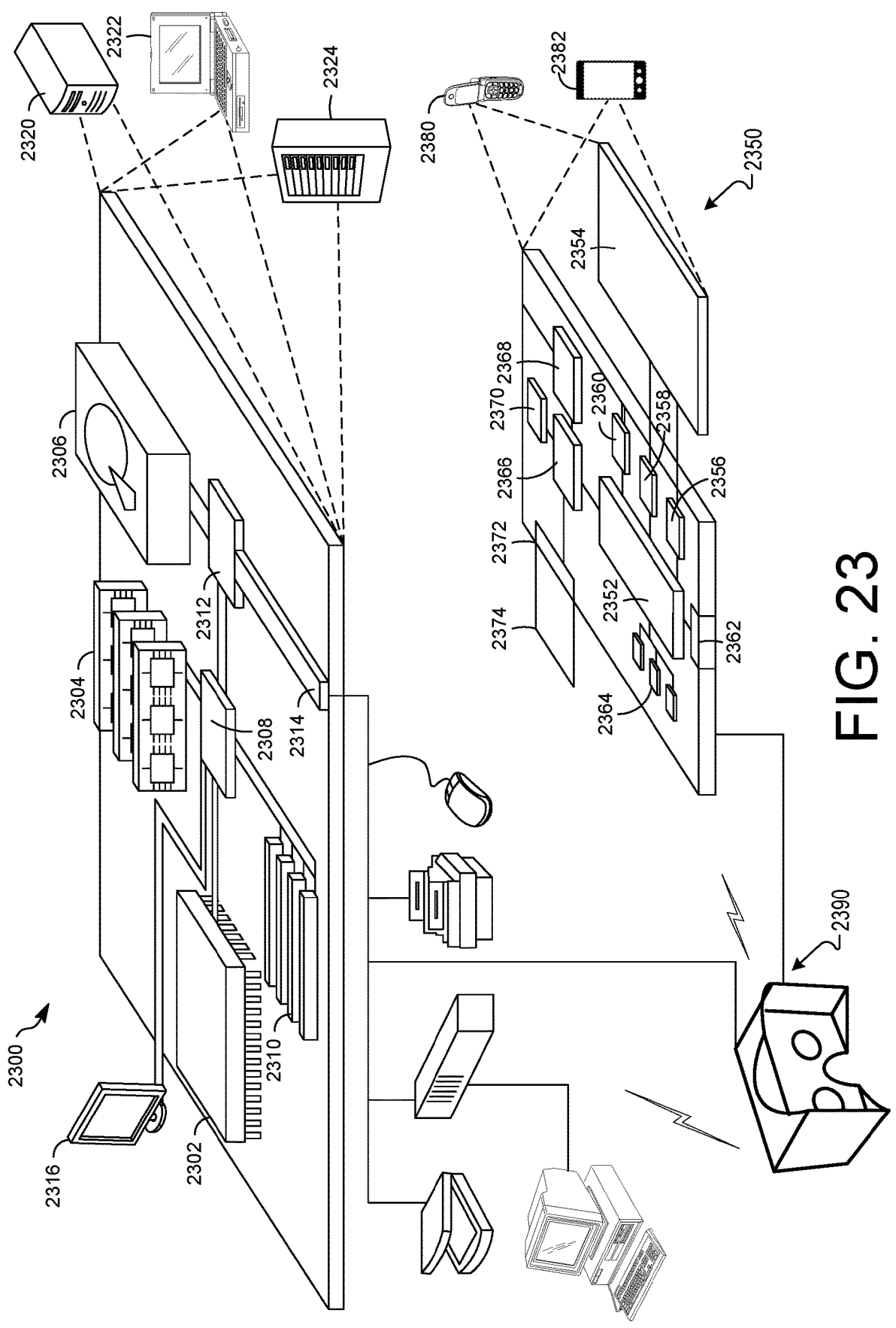
FIG. 23 shows an example of a computer device and a mobile computer device according to an aspect.

FIG. 23 shows an example of a computer device 2300 and a mobile computer device 2350, which may be used with the techniques described here. In some implementations, the computing device 120 of FIGS. 1A through 1D is an example of the computer device 2300 or the mobile computer device 2350. Computing device 2300 is intended to represent various forms of digital computers, such as laptops, desktops, tablets, workstations, personal digital assistants, televisions, servers, blade servers, mainframes, and other appropriate computing devices. Computing device 2350 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 2300 includes a processor 2302, memory 2304, a storage device 2306, a high-speed interface 2308 connecting to memory 2304 and high-speed expansion ports 2310, and a low speed interface 2312 connecting to low speed bus 2314 and storage device 2306. The processor 2302 can be a semiconductor-based processor. The memory 2304 can be a semiconductor-based memory. Each of the components 2302, 2304, 2306, 2308, 2310, and 2312, are interconnected using various busses, and may be mounted on a common motherboard or in other manners as appropriate. The processor 2302 can process instructions for execution within the computing device 2300, including instructions stored in the memory 2304 or on the storage device 2306 to display graphical information for a GUI on an external input/output device, such as display 2316 coupled to high speed interface 2308. In other implementations, multiple processors and/or multiple buses may be used, as appropriate, along with multiple memories and types of memory. Also, multiple computing devices 2300 may be connected, with each device providing portions of the necessary operations (e.g., as a server bank, a group of blade servers, or a multi-processor system).

The memory 2304 stores information within the computing device 2300. In one implementation, the memory 2304 is a volatile memory unit or units. In another implementation, the memory 2304 is a non-volatile memory unit or units. The memory 2304 may also be another form of computer-readable medium, such as a magnetic or optical disk.

The storage device 2306 is capable of providing mass storage for the computing device 2300. In one implementation, the storage device 2306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2304, the storage device 2306, or memory on processor 2302.

The high speed controller 2308 manages bandwidth-intensive operations for the computing device 2300, while the low speed controller 2312 manages lower bandwidth-intensive operations. Such allocation of functions is exemplary only. In one implementation, the high-speed controller 2308 is coupled to memory 2304, display 2316 (e.g., through a graphics processor or accelerator), and to high-speed expansion ports 2310, which may accept various expansion cards (not shown). In the implementation, low-speed controller 2312 is coupled to storage device 2306 and low-speed expansion port 2314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2300 may be implemented in a number of different forms, as shown in the figure. For example, it may be implemented as a standard server 2320, or multiple times in a group of such servers. It may also be implemented as part of a rack server system 2324. In addition, it may be implemented in a personal computer such as a laptop computer 2322. Alternatively, components from computing device 2300 may be combined with other components in a mobile device (not shown), such as device 2350. Each of such devices may contain one or more of computing devices 2300, 2350, and an entire system may be made up of multiple computing devices 2300, 2350 communicating with each other.

Computing device 2350 includes a processor 2352, memory 2364, an input/output device such as a display 2354, a communication interface 2366, and a transceiver 2368, among other components. The device 2350 may also be provided with a storage device, such as a microdrive or other device, to provide additional storage. Each of the components 2350, 2352, 2364, 2354, 2366, and 2368, are interconnected using various buses, and several of the components may be mounted on a common motherboard or in other manners as appropriate.

The processor 2352 can execute instructions within the computing device 2350, including instructions stored in the memory 2364. The processor may be implemented as a chipset of chips that include separate and multiple analog and digital processors. The processor may provide, for example, for coordination of the other components of the device 2350, such as control of user interfaces, applications run by device 2350, and wireless communication by device 2350.

Processor 2352 may communicate with a user through control interface 2358 and display interface 2356 coupled to a display 2354. The display 2354 may be, for example, a TFT LCD (Thin-Film-Transistor Liquid Crystal Display) or an OLED (Organic Light Emitting Diode) display, or other appropriate display technology. The display interface 2356 may comprise appropriate circuitry for driving the display 2354 to present graphical and other information to a user. The control interface 2358 may receive commands from a user and convert them for submission to the processor 2352. In addition, an external interface 2362 may be provided in communication with processor 2352, so as to enable near area communication of device 2350 with other devices. External interface 2362 may provide, for example, for wired communication in some implementations, or for wireless communication in other implementations, and multiple interfaces may also be used.

The memory 2364 stores information within the computing device 2350. The memory 2364 can be implemented as one or more of a computer-readable medium or media, a volatile memory unit or units, or a non-volatile memory unit or units. Expansion memory 2374 may also be provided and connected to device 2350 through expansion interface 2372, which may include, for example, a SIMM (Single In Line Memory Module) card interface. Such expansion memory 2374 may provide extra storage space for device 2350, or may also store applications or other information for device 2350. Specifically, expansion memory 2374 may include instructions to carry out or supplement the processes described above, and may include secure information also. Thus, for example, expansion memory 2374 may be provided as a security module for device 2350, and may be programmed with instructions that permit secure use of device 2350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2364, expansion memory 2374, or memory on processor 2352 that may be received, for example, over transceiver 2368 or external interface 2362.

Device 2350 may communicate wirelessly through communication interface 2366, which may include digital signal processing circuitry where necessary. Communication interface 2366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2368. In addition, short-range communication may occur, such as using a Bluetooth, Wi-Fi, or other such transceiver (not shown). In addition, GPS (Global Positioning System) receiver module 2370 may provide additional navigation- and location-related wireless data to device 2350, which may be used as appropriate by applications running on device 2350.

Device 2350 may also communicate audibly using audio codec 2360, which may receive spoken information from a user and convert it to usable digital information. Audio codec 2360 may likewise generate audible sound for a user, such as through a speaker, e.g., in a handset of device 2350. Such sound may include sound from voice telephone calls, may include recorded sound (e.g., voice messages, music files, etc.) and may also include sound generated by applications operating on device 2350.

The computing device 2350 may be implemented in a number of different forms, as shown in the figure. For example, it may be implemented as a cellular telephone 2380. It may also be implemented as part of a smart phone 2382, personal digital assistant, or another similar mobile device.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A non-transitory computer-readable medium storing executable instructions that, when executed by at least one processor, cause the at least one processor to execute operations, the operations comprising:

activating a compatibility mode for an application installed on a computing device according to an operating system of the computing device wherein activating the compatibility mode causes the at least one processor to set and maintain a user interface of the application at a predefined window size that is less than a size of a display of the computing device; and in response to the user interface being moved within a threshold distance from an edge of the display of the computing device, aligning the user interface with the edge of the display while maintaining an aspect ratio of the user interface.

2. The non-transitory computer-readable medium of claim 1, wherein the operations further comprise:

enabling a keyboard key control for executing an action of the application; and displaying information about the keyboard key control in the user interface of the application.

3. The non-transitory computer-readable medium of claim 1, wherein the operations further comprise:

detecting a drag-resize event for resizing the user interface of the application; and disregarding the drag-resize event.

4. The non-transitory computer-readable medium of claim 1, wherein the operations further comprise:

initiating display of a user interface object defining a plurality of predefined sizing options for the user interface of the application, wherein the predefined window size is one of the plurality of predefined sizing options.

5. The non-transitory computer-readable medium of claim 4, wherein a window resize lock is enabled to maintain the user interface at the predefined window size.

6. The non-transitory computer-readable medium of claim 1, wherein the operations further comprise:

determining whether to activate the compatibility mode for the application based on compatibility information, wherein activation of the compatibility mode indicates that the application is missing a function or has a function incompatible with the operating system of the computing device.

7. The non-transitory computer-readable medium of claim 6, wherein the operations further comprise:

receiving the compatibility information from an application store platform.

8. The non-transitory computer-readable medium of claim 6, wherein the compatibility information includes metadata included in an installation package for installing the application on the computing device.

9. An apparatus comprising:

at least one processor; and a non-transitory computer-readable medium storing executable instructions that when executed by the at least one processor to cause the at least one processor to execute operations, the operations comprising:

activating a compatibility mode for an application installed on a computing device according to an operating system of the computing device wherein activating the compatibility mode causes the at least one processor to set and maintain a user interface of the application at a predefined window size that is less than a size of a display of the computing device; and in response to the user interface being moved within a threshold distance from an edge of the display of the computing device, aligning the user interface with the edge while maintaining an aspect ratio of the user interface.

10. The apparatus of claim 9, wherein the operations further comprise:

rendering an operating system setting interface, the operating system setting interface including a setting that allows enabling and disabling of a window resize lock to restrict a change to a window size or shape of the user interface of the application from the predefined window size.

11. The apparatus of claim 9, wherein the operations further comprise:

programmatically adjusting a scale of application content from a first scale to a second scale; and rendering the application content in the user interface of the application according to the second scale.

12. The apparatus of claim 9, wherein the operations further comprise:

detecting a drag-resize event for resizing the user interface of the application; and disregarding the drag-resize event.

13. The apparatus of claim 9, wherein the operations further comprise:

initiating display of a user interface object defining a plurality of predefined sizing options for the user interface of the application, wherein the predefined window size is one of the plurality of predefined sizing options.

14. The apparatus of claim 9, wherein the operations further comprise:

enabling a keyboard key control for executing an action of the application; and displaying information about the keyboard key control in the user interface of the application.

15. A method comprising:

initiating a display of a user interface object defining a predefined sizing option and a resizeable option;

in response to a selection of the predefined sizing option, activating a compatibility mode for an application installed on a computing device according to an operating system of the computing device, wherein the compatibility mode causes a user interface of the application to be maintained at a predefined window size; and in response to the user interface being moved within a threshold distance from an edge of a display of the computing device while the compatibility mode is active, aligning the user interface with the edge while maintaining an aspect ratio of the user interface.

16. The method of claim 15, further comprising:

enabling a keyboard key control for executing an action of the application; and displaying information about the keyboard key control in the user interface of the application.

17. The method of claim 15, further comprising:

detecting a drag-resize event for resizing the user interface of the application from the predefined window size; and disregarding the drag-resize event.

18. The method of claim 15, further comprising:

wherein the predefined sizing option is a first predefined sizing option and the predefined window size is a first predefined size, wherein the user interface object defines the first predefined sizing option and a second predefined sizing option that restricts a window size of the user interface to a second predefined size that is different than the first predefined size.

19. The non-transitory computer-readable medium of claim 1, wherein the operations further comprise:

rendering an operating system setting interface that includes a user interface object configured to toggle the maintaining of the user interface at the predefined window size.

20. The apparatus of claim 9, wherein the operations further comprise: determining to activate the compatibility mode for the application based on compatibility information indicating the application has a function that is incompatible with the operating system of the computing device.

21. The method of claim 15, wherein aligning the user interface with the edge further comprises:

resizing the user interface to a second predefined window size associated with the edge.

* * * * *